US010322715B2

(12) United States Patent
Tsuda et al.

(10) Patent No.: US 10,322,715 B2
(45) Date of Patent: Jun. 18, 2019

(54) CONTROL DEVICE FOR PERFORMING A START CONTROL

(71) Applicant: AISIN AW CO., LTD., Anjo-shi, Aichi-ken (JP)

(72) Inventors: Kohei Tsuda, Nishio (JP); Takashi Yoshida, Nishio (JP); Nao Katagiri, Anjo (JP)

(73) Assignee: AISIN AW CO., LTD., Anjo (JP)

( * ) Notice: Subject to any disclaimer, the term of this patent is extended or adjusted under 35 U.S.C. 154(b) by 0 days.

(21) Appl. No.: 15/556,154

(22) PCT Filed: Mar. 30, 2016

(86) PCT No.: PCT/JP2016/060459
§ 371 (c)(1),
(2) Date: Sep. 6, 2017

(87) PCT Pub. No.: WO2016/159120
PCT Pub. Date: Oct. 6, 2016

(65) Prior Publication Data
US 2018/0037220 A1 Feb. 8, 2018

(30) Foreign Application Priority Data
Mar. 31, 2015 (JP) .................................. 2015-074182

(51) Int. Cl.
B60W 20/30 (2016.01)
B60W 20/40 (2016.01)
(Continued)

(52) U.S. Cl.
CPC ............... B60W 20/40 (2013.01); B60K 6/48 (2013.01); B60L 15/20 (2013.01); B60L 50/16 (2019.02);
(Continued)

(58) Field of Classification Search
CPC .... B60W 20/30; B60W 20/40; B60W 30/192; F02N 11/0803; Y02T 10/48; Y02T 10/6286; B60K 6/48
See application file for complete search history.

(56) References Cited

U.S. PATENT DOCUMENTS 4,680,959 A * 7/1987 Henry ................. G01M 15/044
703/8
5,046,383 A * 9/1991 Butts ..................... F16H 61/061
477/120
(Continued)

FOREIGN PATENT DOCUMENTS

JP 2004027844 A * 1/2004
JP 2006306210 A * 11/2006
(Continued)

OTHER PUBLICATIONS

JPO machine translation of JP 2006-306210 (original JP document published Nov. 9, 2006) (Year: 2006).*
(Continued)

Primary Examiner — Behrang Badii
Assistant Examiner — David A Testardi
(74) Attorney, Agent, or Firm — Oliff PLC

(57) ABSTRACT

A control device that includes an electronic control unit that is configured to, in a case where a request to start the internal combustion engine is made while a downshift for changing a speed ratio of the speed change device so that the speed ratio after shifting is higher than the speed ratio before shifting is being performed in the electric drive state, perform the first start control after the downshift is completed.

10 Claims, 8 Drawing Sheets

(51) Int. Cl.
- *F02N 11/08* (2006.01)
- *B60K 6/48* (2007.10)
- *B60L 15/20* (2006.01)
- *B60W 10/02* (2006.01)
- *B60W 10/06* (2006.01)
- *B60W 10/08* (2006.01)
- *B60W 20/00* (2016.01)
- *F16H 61/02* (2006.01)
- *F16H 61/68* (2006.01)
- *F16H 63/50* (2006.01)
- *B60W 30/192* (2012.01)
- *B60L 50/16* (2019.01)

(52) U.S. Cl.
CPC ............ *B60W 10/02* (2013.01); *B60W 10/06* (2013.01); *B60W 10/08* (2013.01); *B60W 20/00* (2013.01); *B60W 20/30* (2013.01); *B60W 30/192* (2013.01); *F02N 11/0803* (2013.01); *F16H 61/02* (2013.01); *F16H 61/68* (2013.01); *F16H 63/50* (2013.01); *B60L 2240/421* (2013.01); *B60L 2240/423* (2013.01); *B60L 2240/443* (2013.01); *B60W 2510/1005* (2013.01); *B60W 2510/1025* (2013.01); *Y02T 10/645* (2013.01); *Y02T 10/70* (2013.01); *Y02T 10/7077* (2013.01); *Y02T 10/72* (2013.01); *Y02T 10/7275* (2013.01)

(56) References Cited

U.S. PATENT DOCUMENTS

| | | | | |
|---|---|---|---|---|
| 5,079,970 A * | 1/1992 | Butts | ............... | B60W 10/06 192/109 F |
| 5,134,904 A * | 8/1992 | Minagawa | ............ | F16H 61/0437 477/120 |
| 5,207,122 A * | 5/1993 | Minagawa | ............ | F16H 61/061 475/123 |
| 2007/0056783 A1* | 3/2007 | Joe | ............ | B60K 6/48 180/65.265 |
| 2008/0132379 A1* | 6/2008 | Matsubara | ............ | B60K 6/40 477/3 |
| 2008/0195266 A1* | 8/2008 | Le Neindre | ............ | B60K 6/48 701/22 |
| 2008/0228363 A1* | 9/2008 | Kouno | ............ | B60K 6/48 701/54 |
| 2008/0258474 A1* | 10/2008 | Tabata | ............ | B60K 6/365 290/40 A |
| 2009/0312144 A1* | 12/2009 | Allgaier | ............ | B60K 6/48 477/5 |
| 2012/0115676 A1* | 5/2012 | Schiele | ............ | B60K 6/48 477/5 |
| 2013/0124027 A1* | 5/2013 | Tanishima | ............ | B60K 6/48 701/22 |
| 2013/0231815 A1* | 9/2013 | Tanishima | ............ | B60K 6/48 701/22 |
| 2013/0296123 A1* | 11/2013 | Doering | ............ | B60W 10/02 477/5 |
| 2013/0297135 A1* | 11/2013 | Yamanaka | ............ | B60K 6/48 701/22 |
| 2013/0297136 A1* | 11/2013 | Yamanaka | ............ | B60K 6/48 701/22 |
| 2014/0018207 A1* | 1/2014 | Kobayashi | ............ | B60K 6/48 477/5 |
| 2014/0222270 A1* | 8/2014 | Tsutsumi | ............ | B60W 20/40 701/22 |
| 2014/0297089 A1* | 10/2014 | Tsuda | ............ | B60W 10/115 701/22 |
| 2015/0051767 A1* | 2/2015 | Mohri | ............ | B60L 11/005 701/22 |
| 2015/0142282 A1* | 5/2015 | Lee | ............ | B60W 10/11 701/58 |
| 2016/0214599 A1* | 7/2016 | Doering | ............ | B60W 30/19 |

FOREIGN PATENT DOCUMENTS

| | | | |
|---|---|---|---|
| JP | 2010143426 A | * | 7/2010 |
| JP | 2010149559 A | * | 7/2010 |
| JP | 2010149560 A | * | 7/2010 |
| JP | 2011-179598 A | | 9/2011 |
| JP | 2011179598 A | * | 9/2011 |
| JP | 2012-121568 A | | 6/2012 |
| JP | 2013-147193 A | | 8/2013 |
| JP | 2014218168 A | * | 11/2014 |
| WO | 2012/102370 A1 | | 8/2012 |

OTHER PUBLICATIONS

Jun. 28, 2016 International Search Report issued in Patent Application No. PCT/JP2016/060459.

* cited by examiner

|  | C1 | C2 | C3 | B1 | B2 | F |
|---|---|---|---|---|---|---|
| Rev |  |  | O |  | O |  |
| 1st | O |  |  |  | (O) | △ |
| 2nd | O |  |  | O |  |  |
| 3rd | O |  | O |  |  |  |
| 4th | O | O |  |  |  |  |
| 5th |  | O | O |  |  |  |
| 6th |  | O |  | O |  |  |

CONTROL DEVICE FOR PERFORMING A START CONTROL

BACKGROUND

The present disclosure relates to control devices that control a vehicle drive device in which an engagement device, a rotating electrical machine, and a speed change device are arranged in this order from the internal combustion engine side on a power transmission path connecting the internal combustion engine and wheels.

A control device described in Japanese Patent Application Publication No. 2012-121568 (JP 2012-121568 A) is known as such a control device. Japanese Patent Application Publication No. 2012-121568 describes a technique of reducing shock that is caused when start control to start an internal combustion engine with output torque of a rotating electrical machine is performed in an electric drive state where a vehicle is moved with output torque of the rotating electrical machine with an engagement device being disengaged. Specifically, Japanese Patent Application Publication No. 2012-121568 describes that a shift engagement device of the speed change device which has been engaged to establish a shift speed is controlled to a slip engaged state during the control to start the internal combustion engine, whereby this shift engagement device absorbs variation in torque which is caused by starting of the internal combustion engine. Japanese Patent Application Publication No. 2012-121568 describes that, if a downshift of the speed change device is requested when starting the internal combustion engine, a shift engagement device to be disengaged by the downshift is selected as a shift engagement device to be controlled to a slip engaged state in order to absorb the variation in torque.

SUMMARY

In order to ensure drivability for the driver of a vehicle, it is desirable to cause the rotating electrical machine to output traveling torque of the magnitude corresponding to required wheel torque (torque required to be transmitted to the wheels) so that torque of the same magnitude as the required wheel torque is transmitted to the wheels even when control to start the internal combustion engine and a downshift of the speed change device are being performed in an electric drive state. Accordingly, in the case where the control to start the internal combustion engine is performed in the electric drive state, the rotating electrical machine is required to output starting torque for starting the combustion engine in addition to the traveling torque. When a downshift is performed in the electric drive state, the rotating electrical machine is required to output, in addition to the traveling torque, inertia torque for changing the rotational speed of the rotating electrical machine by an amount corresponding to the amount of change of the speed ratio. Accordingly, for example, in the case where a request to start the internal combustion engine is made while a downshift is being performed in the electric drive state and the control to start the internal combustion engine is performed in parallel with downshift control, the rotating electrical machine is required to output both the starting torque and the inertia torque in addition to the traveling torque.

A request to start the internal combustion engine is typically made in situations where the required wheel torque is large. Accordingly, in the case where the control to start the internal combustion engine is performed in parallel with the downshift control as described above, the total of the traveling torque, the starting torque, and the inertia torque may become larger than maximum torque that can be output from the rotating electrical machine. That is, if the control to start the internal combustion engine is performed in parallel with the downshift control, a shortage of the output torque of the rotating electrical machine occurs, which may affect the progress of the downshift operation that has already been started. However, Japanese Patent Application Publication No. 2012-121568 does not describe control that is performed in the case where a request to start the internal combustion engine is made while a downshift is being performed in the electric drive state.

An exemplary aspect of the disclosure implements a control device that can start an internal combustion engine without significantly affecting the progress of a downshift operation that has already been started, if a request to start the internal combustion engine is made while a downshift is being performed in an electric drive state.

In view of the above, a control device that controls a vehicle drive device in which an engagement device, a rotating electrical machine, and a speed change device are arranged in this order from an internal combustion engine side on a power transmission path connecting the internal combustion engine and wheels in that first start control is start control to start the internal combustion engine with output torque of the rotating electrical machine via the engagement device, and an electric drive state is a drive state where a vehicle is moved with the output torque of the rotating electrical machine with the engagement device being in a disengaged state, the control device includes an electronic control unit that is configured to, in a case where a request to start the internal combustion engine is made while a downshift for changing a speed ratio of the speed change device so that the speed ratio after shifting is higher than the speed ratio before shifting is being performed in the electric drive state, perform the first start control after the downshift is completed.

With this configuration, in the case where a request to start the internal combustion engine is made while a downshift is being performed in the electric drive state, and the first start control is to be performed, the first start control is performed after the downshift is completed. That is, the first start control that requires the rotating electrical machine to output starting torque is not performed as long as the rotating electrical machine is required to output inertia torque for changing a rotational speed of the rotating electrical machine. Accordingly, the downshift operation that has already been started can be appropriately made to proceed even if a request to start the internal combustion engine is made while a downshift is being performed in the electric drive state. For example, the internal combustion engine can be started by performing the first start control after a change of the rotational speed of the rotating electrical machine for the downshift is completed (that is, when the rotating electrical machine need not output the inertia torque), or can be started before the above timing by a method that does not require the output torque of the rotating electrical machine. In either case, the internal combustion engine can be started without significantly affecting the progress of the downshift operation that has already been started.

DETAILED DESCRIPTION OF EMBODIMENTS

Figure 1:
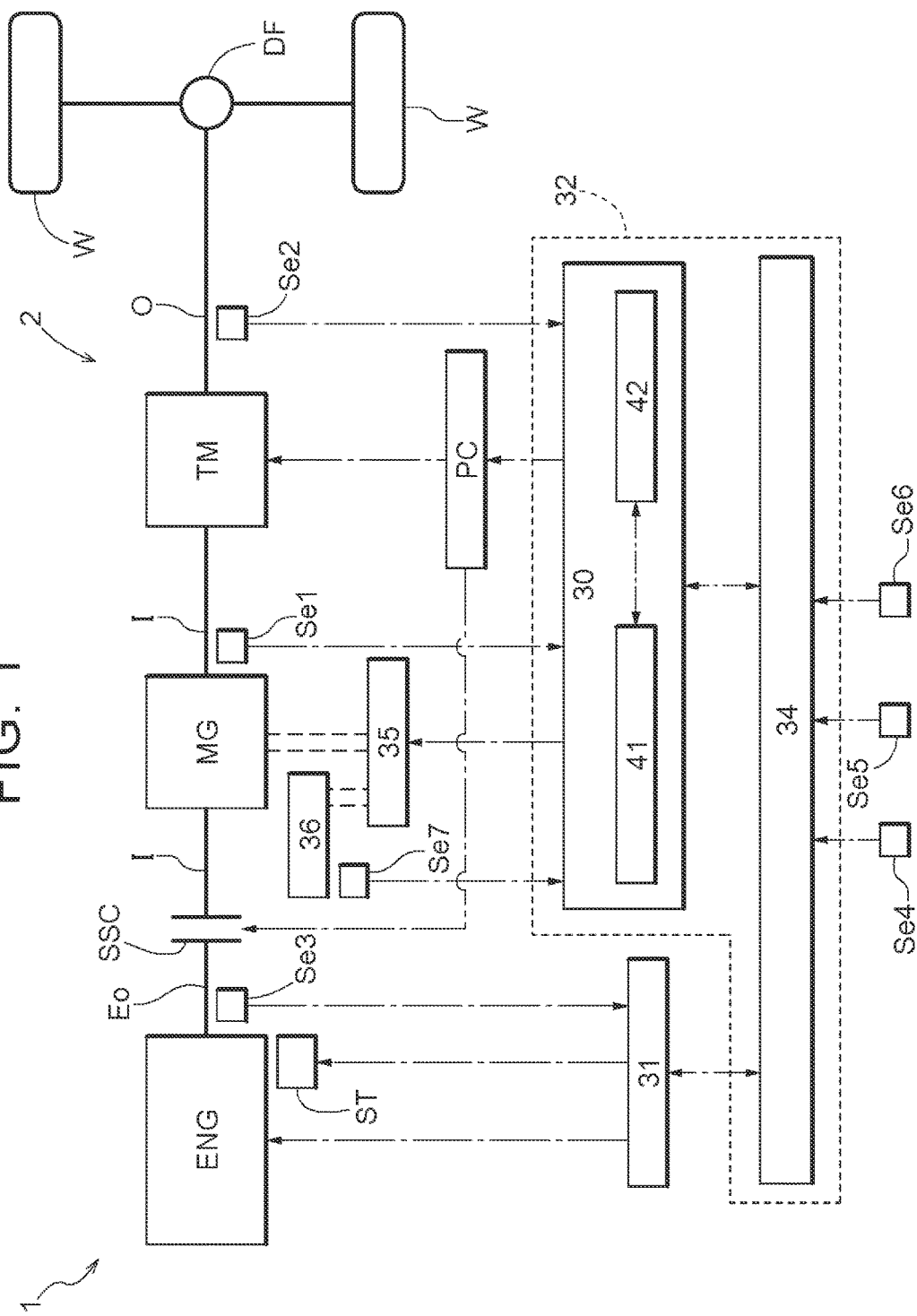
FIG. 1 is a diagram showing general configurations of a vehicle drive device and a control device according to an embodiment.

An embodiment of a control device will be described with reference to the accompanying drawings. The control device is a control device that controls a vehicle drive device. In the present embodiment, as shown in FIG. 1, a control device 32 includes a drive control unit 30 and a vehicle control unit 34.

In the following description, the expression "drivingly coupled" means the state where two rotary elements are coupled together so that they can transmit a driving force therebetween. The concept of this expression includes the state where two rotary elements are coupled together so as to rotate together, and the state where two rotary elements are coupled together so that they can transmit a driving force therebetween via one or more transmission members. Such transmission members include various members that transmit rotation at the same speed or a shifted speed (such as a shaft, a gear mechanism, a belt, and a chain), and may include engagement devices that selectively transmit rotation and a driving force (such as a friction engagement device and a meshing engagement device).

Regarding the states of engagement of a friction engagement device, the "engaged state" refers to the state where the transfer torque capacity is being generated in the friction engagement device. The transfer torque capacity is the magnitude of maximum torque that can be frictionally transmitted by the friction engagement device. The magnitude of the transfer torque capacity changes in proportion to the engagement pressure of the friction engagement device (the pressure that presses an input-side engagement member and an output-side engagement member against each other). The "engaged state" includes a "direct engaged state" where there is no difference in rotational speed (no slipping) between the pair of engagement members (the input-side engagement member and the output-side engagement member) of the friction engagement device, and a "slip engaged state" where there is a difference in rotational speed between the pair of engagement members of the friction engagement device.

The "disengaged state" refers to the state where no transfer torque capacity is being generated in the friction engagement device. There are cases where the transfer torque capacity is generated in the friction engagement device by dragging between the engagement members (friction members) even when a command to generate the transfer torque capacity has not been output from the control device. In this specification, such drag torque is not considered for classification of the states of engagement, and the "disengaged state" includes the state where the transfer torque capacity is being generated by dragging between the engagement members when a command to generate the transfer torque capacity has not been output.

When the friction engagement device is in an engaged state, torque is transmitted between the pair of engagement members by friction between the pair of engagement members. When the friction engagement device is in a slip engaged state, torque (slip torque) with the magnitude of the transfer torque capacity is transmitted from the engagement member rotating at a higher speed to the engagement member rotating at a lower speed by kinetic friction. When the friction engagement device is in a direct engaged state, torque acting between the pair of engagement members is transmitted by static friction. In this case, the maximum torque that can be transmitted by static friction is the transfer torque capacity.

1. Configuration of Vehicle Drive Device

The configuration of a vehicle drive device 2 that is controlled by the control device 32 according to the present embodiment will be described. As shown in FIG. 1, a vehicle 1 (hybrid vehicle) includes an internal combustion engine ENG the vehicle drive device 2, and wheels W. In FIG. 1, transmission paths for a driving force are shown by solid lines, and transmission paths for signals and oil pressures are shown by alternate long and short dash lines, and transmission paths for electric power are shown by double dashed lines. The vehicle drive device 2 includes an engagement device SSC, a rotating electrical machine MQG and a speed change device TM in this order from the internal combustion engine ENG side on a power transmission path connecting the internal combustion engine ENG and the wheels W. The engagement device SSC is a friction engagement device. The internal combustion engine is a motor (e.g., a gasoline engine, a diesel engine, etc.) that is driven by fuel combustion in the engine to output power. The term "rotating electrical machine" is used as a concept including all of a motor (electric motor), a generator (electric generator), and a motor-generator that functions as both a motor and a generator as necessary. The vehicle drive device 2 transmits torque of at least one of the internal combustion engine ENG and the rotating electrical machine MG to the wheels W to move the vehicle 1. In this specification, positive torque refers to torque in such a direction that the torque moves the vehicle 1 forward (torque in a forward acceleration direction), and negative torque refers to torque in the opposite direction. The vehicle drive device 2 is configured to transmit output torque of the internal combustion engine ENG to the wheels W as positive torque. The speed change device TM selectively establishes a plurality of shift speeds with different speed ratios. The speed change device TM includes a plurality of shift engagement devices (see FIG. 2).

As shown in FIG. 1, the vehicle drive device 2 includes an input member I and an output member O. The input member I is a transmission member that is disposed on the power transmission path between the engagement device SSC and the speed change device TM. In the present embodiment, the input member I is a shaft member functioning as an input shaft of the speed change device TM. The output member O is a transmission member that is disposed on the power transmission path between the speed change device TM and the wheels W. In the present embodiment, the output member O is a shaft member functioning as an output shaft of the speed change device TM. An output differential gear unit DF is disposed on the power transmission path between the output member O and the wheels W, and rotation of the output member O is distributed and transmitted to the two wheels W, namely the right and left wheels W, via the output differential gear unit DF.

An output shaft Eo (e.g., a crankshaft) of the internal combustion engine ENG is drivingly coupled to the input member I via the engagement device SSC. The engagement device SSC is a clutch. In the present embodiment, when the engagement device SSC is in a direct engaged state, the output shaft Eo and the input member I rotate together. When starting the internal combustion engine ENG, the output shaft Eo of the internal combustion engine ENG is driven to rotate (cranking) by, e.g., torque of the rotating electrical machine MG which is transmitted via the engagement device SSC. In the present embodiment, the vehicle 1 includes a starter motor ST serving as a dedicated rotating electrical machine for starting the internal combustion engine ENG and the output shaft Eo of the internal combustion engine ENG may be driven to rotate by torque of the starter motor ST when starting the internal combustion engine ENG The rotating electrical machine MG is supplied with electric power from an electrical storage device 36 to perform power running, or supplies electric power generated (regenerated) by torque of the internal combustion engine ENG and inertial force of the vehicle 1 to the electrical storage device 36 to store the electric power therein. Although not shown in the figures, the rotating electrical machine MG includes a stator fixed to a non-rotary member such as a case and a rotor drivingly coupled to the input member I. In the present embodiment, the rotor of the rotating electrical machine MG rotates with the input member I. Accordingly, when the engagement device SSC is in a direct engaged state, the rotating electrical machine MG (rotor) and the internal combustion engine ENG (output shaft Eo) rotate together.

The speed change device TM shifts rotation of the input member I (shift input shaft) and outputs the shifted rotation to the output member O (shift output shaft). In the present embodiment, the speed change device TM is a stepped automatic speed change device that can establish a plurality of shift speeds with different speed ratios. The speed change device TM shifts rotation of the input member I at the speed ratio corresponding to the established shift speed and transmits the shifted rotation to the output member O. As used herein, the "speed ratio" is the ratio of the rotational speed of the input member I to the rotational speed of the output member O, namely the rotational speed of the input member I divided by the rotational speed of the output member O. The speed change device TM includes the plurality of shift engagement devices and establishes the plurality of shift speeds with different speed ratios according to the states of engagement of the shift engagement devices. In the present embodiment, each shift speed is established with two or more (in this example, two) of the plurality of shift engagement devices being engaged and the remainder being disengaged.

Figures 2, 3:
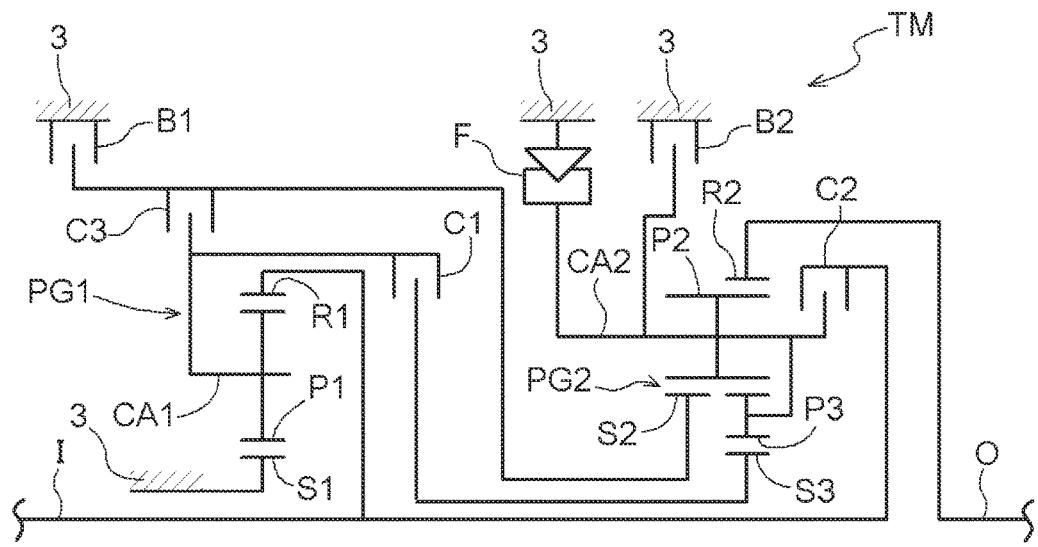
FIG. 2 is a skeleton diagram of a speed change device according to the embodiment.
FIG. 3 is an operation table of the speed change device according to the embodiment.

Specifically, as shown in FIG. 2, the speed change device TM includes, as the shift engagement devices, a first clutch C1, a second clutch C2, a third clutch C3, a first brake B1, a second brake B2, and a one-way clutch F (unidirectional clutch). The shift engagement devices other than the one-way clutch F are friction engagement devices. As shown in the operation table of FIG. 3, each shift speed is established with two of the plurality of shift engagement devices being engaged and the remainder being disengaged. In this example, the speed change device TM can establish six forward shift speeds (first speed 1st, second speed 2nd, third speed 3rd, fourth speed 4th, fifth speed 5th, and sixth speed 6th) with different speed ratios, and a single reverse shift speed (Rev). Regarding the forward shift speeds, the speed ratio decreases gradually from the first speed toward the sixth speed (that is, toward a higher shift speed). In the operation table of FIG. 3, "○" means that the shift engagement device is engaged, and "blank" means that the shift engagement device is disengaged. "(○)" means that the shift engagement device is engaged in situations such as where braking using rotational resistance of the internal combustion engine ENG (what is called engine brake) is performed. "Δ" means that the one-way clutch F is disengaged when the rotational direction of a member (in this example, a second carrier CA2) whose rotation is to be restricted by the one-way clutch F is one direction, and is engaged when the rotational direction of this member is the other direction.

In the present embodiment, as shown in FIG. 2, the speed change device TM is formed by combination of two differential gear units, namely a first differential gear unit PG1 and a second differential gear unit PG2. The first differential gear unit PG1 is formed by a single-pinion type planetary gear mechanism having three rotary elements (a first sun gear S1, a first carrier CA1, and a first ring gear R1). The first carrier CA1 supports a plurality of first pinion gears P1 meshing with the first sun gear S1 and with the first ring gear R1. The second differential gear unit PG2 is formed by a Ravigneaux type planetary gear mechanism having four rotary elements (a second sun gear S2, a third sun gear S3, a second carrier CA2, and a second ring gear R2). The second carrier CA2 supports a plurality of second pinion gears P2 (long pinion gears) meshing with the second sun gear S2 and with the second ring gear R2, and a plurality of third pinion gears P3 (short pinion gears) meshing with the second pinion gears P2 and with the third sun gear S3.

The first ring gear R1 is drivingly coupled to the input member I, and in this example, is coupled to the input member I so as to rotate therewith. The second ring gear R2 is drivingly coupled to the output member O, and in this example, is coupled to the output member O so as to rotate therewith. The first carrier CA1 is drivingly coupled to the third sun gear S3 via the first clutch C1 and is drivingly coupled to the second sun gear S2 via the third clutch C3. In this example, the first carrier CA1 rotates with the third sun gear S3 when the first clutch C1 is in a direct engaged state, and the first carrier CA1 rotates with the second sun gear S2 when the third clutch C3 is in a direct engaged state. The first ring gear R1 is drivingly coupled to the second carrier CA2 via the second clutch C2. In this example, the first ring gear R1 rotates with the second carrier CA2 when the second clutch C2 is in a direct engaged state.

The first sun gear S1 is held stationary with respect to a case 3 (an example of a non-rotary member) of the vehicle drive device 2 or the speed change device TM. The second sun gear S2 is selectively held stationary with respect to the case 3 via the first brake B1. The second carrier CA2 is selectively held stationary with respect to the case 3 via the second brake B2 and is allowed to rotate relative to the case 3 only in one direction by the one-way clutch F. In the case where positive torque is transmitted from the input member I to the output member O at the first speed 1st, the first clutch C1 is engaged and the other shift engagement devices (except for the one-way clutch) are disengaged. In this case, the second carrier CA2 whose rotation is restricted by the one-way clutch F is subjected to a reaction force of the positive torque transmitted from the input member I to the third sun gear S3 via the first differential gear unit PG1. The positive torque is thus transmitted to the output member O via the second ring gear R2. In the case where negative torque is transmitted from the input member I to the output member O at the first speed 1st, rotation of the second carrier CA2 is not restricted by the one-way clutch F, and the second brake B2 is therefore engaged in addition to the first clutch C1.

2. Configuration of Control Device

As shown in FIG. 1, the present embodiment includes, in addition to the control device 32, an internal combustion engine control device 31 as a control device that controls the state (traveling state etc.) of the vehicle 1. The control device 32 and the internal combustion engine control device 31 include as a core member an arithmetic processing unit such as CPU, and further include a storage device such as RAM or ROM. Each function to be performed by the control device 32 and the internal combustion engine control device 31 is implemented by either software (programs) stored in the storage device such as ROM or hardware such as an arithmetic circuit provided separately, or by both. The arithmetic processing units included in the control device 32 and the internal combustion engine control device 31 operate as a computer that executes the programs. The control device 32 and the internal combustion engine control device 31 can communicate with each other, so that the control device 32 and the internal combustion engine control device 31 perform cooperative control by sharing various information such as detection information of sensors and control parameters and sending and receiving various control signals. One or both of the control device 32 and the internal combustion engine control device 31 may be formed by a collection of a plurality of pieces of hardware (a plurality of separated pieces of hardware) that can communicate with each other. The control device 32 and the internal combustion engine control device 31 may be included in common hardware.

The vehicle 1 includes various sensors, and the control device 32 can obtain detection information of the various sensors. In FIG. 1, an input rotational speed sensor Se1, an output rotational speed sensor Se2, an engine rotational speed sensor Se3, an accelerator operation amount sensor Se4, a brake operation sensor Se5, a shift position sensor Se6, a state-of-charge sensor Se7 are shown as examples of the sensors included in the vehicle 1. The input rotational speed sensor Se1 detects the rotational speed of the input member I or the rotational speed of a member that rotates synchronously with the input member I. The expression "rotate synchronously" means rotating together or rotating at a proportional rotational speed. The output rotational speed sensor Se2 detects the rotational speed of the output member O or the rotational speed of a member that rotates synchronously with the output member O. The engine rotational speed sensor Se3 detects the rotational speed of the internal combustion engine ENG (output shaft Eo) or the rotational speed of a member that rotates synchronously with the internal combustion engine ENG (output shaft Eo). The control device 32 obtains the rotational speed of the input member I and the rotating electrical machine MG (rotor) based on the detection information of the input rotational speed sensor Se1, obtains the rotational speed of the output member O and the vehicle speed based on the detection information of the output rotational speed sensor Se2, and obtains the rotational speed of the internal combustion engine ENG (output shaft Eo) based on the detection information of the engine rotational speed sensor Se3. In the example shown in FIG. 1, the control device 32 obtains the detection information of the engine rotational speed sensor Se3 or the information on the rotational speed of the internal combustion engine ENG (output shaft Eo) based on this detection information via the internal combustion engine control device 31.

The accelerator operation amount sensor Se4 detects the accelerator operation amount corresponding to the amount by which an accelerator pedal is depressed by the driver. The brake operation sensor Se5 detects the brake operation amount corresponding to the amount by which a brake pedal is depressed by the driver. The shift position sensor Se6 detects the selected position of a shift lever. The shift lever is a lever that is operated by the driver in order to select one drive range from a plurality of drive ranges. The selected position (shift position) of the shift lever includes a position for selecting a forward drive range (D range), a position for selecting a reverse drive range (R range), a position for selecting a neutral range (N range), a position for selecting a parking range (P range), etc. The state-of-charge sensor Se7 obtains the state of charge or the amount of electricity stored in the electrical storage device 36 that supplies electric power to the rotating electrical machine MG. The control device 32 (in this example, the vehicle control unit 34 described later) derives required wheel torque (required vehicle torque), namely torque required to be transmitted to the wheels W, based on the sensor detection information such as the accelerator operation amount, the vehicle speed, the shift position, and the state of charge of the electrical storage device 36, and determines a drive mode of the vehicle 1, a target shift speed to be established by the speed change device TM, etc. The drive control unit 30 (engagement control unit 42 described later) included in the control device 32 controls the states of engagement of the engagement device SSC and each shift engagement device according to the determined drive mode and target shift speed. The drive mode includes an electric drive mode in which only torque of the rotating electrical machine MG is transmitted to the wheels W to move the vehicle 1, an engine drive mode in which only torque of the internal combustion engine ENG is transmitted to the wheels W to move the vehicle 1, a hybrid drive mode (parallel drive mode) in which both torque of the rotating electrical machine MG and torque of the internal combustion engine ENG are transmitted to the wheels W to move the vehicle 1. In the electric drive mode, the engagement device SSC is controlled to a disengaged state. In the engine drive mode and the hybrid drive mode, the engagement device SSC is controlled to an engaged state. Hereinafter, the term "electric drive state" refers to a drive state where the vehicle 1 is traveling with output torque of the rotating electrical machine MG with the engagement device SSC being in a disengaged state. The electric drive state is a state that is attained when the vehicle is traveling in the electric drive mode.

In the present embodiment, as shown in FIG. 1, the control device 32 includes the drive control unit 30 and the vehicle control unit 34. The drive control unit 30 and the vehicle control unit 34 can communicate with each other. The drive control unit 30 and the vehicle control unit 34 may be included in either separate pieces of hardware or common hardware. The vehicle control unit 34 performs control for the entire vehicle to coordinate various kinds of control (torque control, engagement control, etc.) to be performed on the internal combustion engine ENG and the vehicle drive device 2. The vehicle control unit 34 has a function to control torque sharing in the entire vehicle. Specifically, the vehicle control unit 34 determines required internal combustion engine torque and required rotating electrical machine torque in view of the torque sharing rates of the internal combustion engine ENG and the rotating electrical machine MG. The required internal combustion engine torque is torque that is required for the internal combustion engine ENG as torque to be output from the internal combustion engine ENG. The required rotating electrical machine torque is torque that is required for the rotating electrical machine MG as torque to be output from the rotating electrical machine MG. In the case where the rotating electrical machine MG is caused to generate electricity, the required rotating electrical machine torque is set to negative torque. The required internal combustion engine torque and the required rotating electrical machine torque are basically determined so that the sum of the required internal combustion engine torque and the required rotating electrical machine torque is equal to the required wheel torque.

The internal combustion engine control device 31 controls operation of the internal combustion engine ENG. In response to a command of required internal combustion engine torque from the vehicle control unit 34, the internal combustion engine control device 31 controls the internal combustion engine ENG so that the internal combustion engine ENG outputs the required internal combustion engine torque. In response to a request to start the internal combustion engine ENG from the vehicle control unit 34, the internal combustion engine control device 31 starts the internal combustion engine ENG by performing a fuel supply to the internal combustion engine ENG starting ignition, etc. In response to a request to stop the internal combustion engine ENG from the vehicle control unit 34, the internal combustion engine control device 31 stops the internal combustion engine ENG by stopping the fuel supply to the internal combustion engine ENG, stopping ignition, etc.

The drive control unit 30 controls the states of engagement of the engagement device SSC and each shift engagement device and controls operation of the rotating electrical machine MG. The drive control unit 30 includes a rotating electrical machine control unit 41 that controls operation of the rotating electrical machine MG, and an engagement control unit 42 that controls the state of engagement of each engagement device, and the rotating electrical machine control unit 41 and the engagement control unit 42 can communicate with each other. Each of the rotating electrical machine control unit 41 and the engagement control unit 42 is formed by either software (programs) stored in the storage device or hardware such as an arithmetic circuit provided separately, or by both. In response to a command of required rotating electrical machine torque from the vehicle control unit 34, the rotating electrical machine control unit 41 controls the rotating electrical machine MG so that the rotating electrical machine MG outputs the required rotating electrical machine torque. Specifically, the rotating electrical machine control unit 41 controls the output torque of the rotating electrical machine MG by controlling an inverter device 35 that converts a direct current voltage of the electrical storage device 36 to an alternating current voltage and supplies the alternating current voltage to the rotating electrical machine MG. The engagement control unit 42 controls the state of engagement of each engagement device (including the engagement device SSC and each shift engagement device) included in the vehicle drive device 2 to the state determined by the vehicle control unit 34. The engagement control unit 42 controls the state of engagement of each engagement device so as to attain a drive mode determined by the vehicle control unit 34 and to establish a target shift speed determined by the vehicle control unit 34.

In the present embodiment, the vehicle control unit 34 determines a target shift speed by referring to a shift map (not shown). The shift map is a map that defines the relationship between the accelerator operation amount and the vehicle speed and the shift speed of the speed change device TM. A plurality of upshift lines and a plurality of downshift lines are defined in the shift map. An upshift means changing the speed ratio of the speed change device so that the speed ratio after shifting is lower than the speed ratio before shifting. A downshift means changing the speed ratio of the speed change device so that the speed ratio after shifting is higher than the speed ratio before shifting. In the present embodiment, since the speed change device TM is a stepped automatic speed change device, an upshift is a change of the shift speed to a higher shift speed (to a relatively lower speed ratio), and a downshift is a change of the shift speed to a lower shift speed (to a relatively higher speed ratio). That is, an upshift means switching the shift speed currently established by the speed change device TM to a shift speed with a lower speed ratio than that of the shift speed currently established by the speed change device TM, and a downshift means switching the shift speed currently established by the speed change device TM to a shift speed with a higher speed ratio than that of the shift speed currently established by the speed change device TM. When the accelerator operation amount and the vehicle speed change and an upshift line is crossed on the shift map accordingly, a target shift speed is upshifed by one shift speed. When the accelerator operation amount and the vehicle speed change and a downshift line is crossed on the shift map accordingly, a target shift speed is downshifed by one shift speed. When performing shift control to switch the shift speed, the engagement control unit 42 performs what is called changeover shifting. Namely, the engagement control unit 42 disengages a disengage-side engagement device, which is a shift engagement device to be disengaged in order to switch the shift speed, and engages an engage-side engagement device, which is a shift engagement device to be engaged in order to switch the shift speed. The engage-side engagement device is an engagement device that is in a disengaged state before the start of shift control and is to be engaged by the shift control. The disengage-side engagement device is an engagement device that is in an engaged state before the start of shift control and is to be disengaged by the shift control. A shift engagement device included in a plurality of shift engagement devices that are engaged to establish a shift speed before shifting but not included in a plurality of shift engagement devices that are engaged to establish a shift speed after shifting is set as a disengage-side engagement device. A shift engagement device included in a plurality of shift engagement devices that are engaged to establish a shift speed after shifting but not included in a plurality of shift engagement devices that are engaged to establish a shift speed before shifting is set as an engage-side engagement device. For example, as shown in FIG. 3, in the case where the shift speed before shifting is the third speed 3rd and the shift speed after shifting is the second speed 2nd, the third clutch C3 is set as a disengage-side engagement device, and the first brake B1 is set as an engage-side engagement device.

In the present embodiment, the engagement devices to be controlled by the engagement control unit 42 are hydraulically driven friction engagement devices. The engagement control unit 42 controls the state of engagement of each engagement device by controlling an oil pressure to be supplied to each engagement device via a hydraulic control device PC. An engagement pressure of each engagement device changes in proportion to the magnitude of the oil pressure being supplied to that engagement device. That is, the magnitude of the transfer torque capacity that is generated in each engagement device changes in proportion to the magnitude of the oil pressure being supplied to that engagement device. The state of engagement of each engagement device is controlled to one of a direct engaged state, a slip engaged state, and a disengaged state according to the oil pressure being supplied thereto. Although not described in detail, the hydraulic control device PC includes hydraulic control valves (such as linear solenoid valves) that regulate the oil pressure of hydraulic oil supplied from an oil pump (not shown). For example, the oil pump is a mechanical pump that is driven by a rotary member included in the vehicle drive device 2, such as the output shaft Eo and the output member O, an electric pump that is driven by a dedicated rotating electrical machine, etc. The hydraulic control device PC regulates the amounts of opening of the hydraulic control valves according to an oil pressure command from the engagement control unit 42 to supply hydraulic oil with oil pressures corresponding to the oil pressure command to each engagement device.

When an internal combustion engine start condition, which is a condition for starting the internal combustion engine ENG is satisfied, the vehicle control unit 34 determines that there is a request to start the internal combustion engine ENG, and performs, in cooperation with the internal combustion engine control device 31 and the drive control unit 30, control to start the internal combustion engine ENG. The internal combustion engine start condition is satisfied when a situation where the vehicle 1 requires torque of the internal combustion engine ENG is created. For example, the internal combustion engine start condition is satisfied when the driver depresses the accelerator pedal hard while the vehicle 1 is stopped or is traveling in the electric drive mode and thus required wheel torque cannot be achieved only with the rotating electrical machine MG. The internal combustion engine start condition is also satisfied when it is required to start the internal combustion engine ENG to charge the electrical storage device 36.

The control to start the internal combustion engine ENG, which is performed by the vehicle control unit 34, includes first start control. The first start control is start control to start the internal combustion engine ENG with output torque of the rotating electrical machine MG via the engagement device SSC. When performing the first start control, the internal combustion engine ENG is rotated with the output torque of the rotating electrical machine MG which is transmitted via the engagement device SSC in a slip engaged state. When the vehicle control unit 34 performs the first start control, the engagement control unit 42 increases the engagement pressure of the engagement device SSC from zero to switch the engagement device SSC from a disengaged state to a slip engaged state. Slip torque (starting torque Ts) of the magnitude corresponding to the engagement pressure (transfer torque capacity) of the engagement device SSC is thus transmitted to the internal combustion engine ENC and the rotational speed of the internal combustion engine ENG increases accordingly. After the rotational speed of the internal combustion engine ENG becomes higher than such a rotational speed that combustion is possible, the internal combustion engine control device 31 starts fuel supply to the internal combustion engine ENG and starts ignition to start combustion in the internal combustion engine ENG. The engagement control unit 42 then increases the engagement pressure of the engagement device SSC to a full engagement pressure to switch the engagement device SSC to a direct engaged state. The full engagement pressure is an engagement pressure that can maintain a slipless engagement state (direct engaged state) even if torque that is transmitted to the engagement device varies. The first start control will be described in detail later with reference to FIG. 7.

In the present embodiment, the control to start the internal combustion engine ENG, which is performed by the vehicle control unit 34, includes second start control in addition to the first start control. The second start control is start control to start the internal combustion engine ENG with output torque of the starter motor ST. When performing the second start control, the internal combustion engine ENG is rotated with the output torque of the starter motor ST. When the vehicle control unit 34 performs the second start control, the internal combustion engine control device 31 supplies electric power to the starter motor ST to rotate the internal combustion engine ENCI and starts fuel supply to the internal combustion engine ENG and starts ignition to start combustion in the internal combustion engine ENG. The engagement control unit 42 then increases the engagement pressure of the engagement device SSC from zero to switch the engagement device SSC from a disengaged state to a direct coupled state. The second start control will be described in detail later with reference to FIG. 9.

Figure 4:
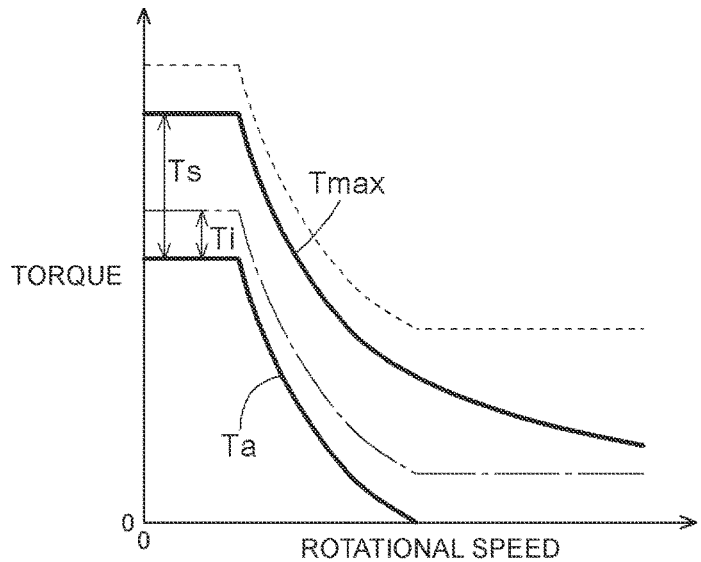
FIG. 4 is a characteristic diagram showing an example of the relationship between the rotational speed and the output torque of a rotating electrical machine.

As described above, when performing the first start control to start the internal combustion engine ENG, the starting torque Ts is transmitted from the rotating electrical machine MG side toward the internal combustion engine ENG side via the engagement device SSC. Accordingly, in order to transmit torque of the same magnitude as required wheel torque to the wheels W even during the first start control, the rotating electrical machine MG needs to output the starting torque Ts in addition to traveling torque (wheel drive torque) of the magnitude corresponding to the required wheel torque. In view of this, in the present embodiment, the control device 32 limits output torque of the rotating electrical machine MG in the electric drive state to maximum torque Tmax that can be output from the rotating electrical machine MG minus output torque of the rotating electrical machine MG (starting torque Ts) which is required to perform the first start control, or less than this subtraction value. That is, as shown in FIG. 4, the output torque of the rotating electrical machine MG in the electric drive state is set to allowable torque Ta, which is the maximum torque Tmax minus the starting torque Ts, or less than the allowable torque Ta. The "output torque of the rotating electrical machine MG in the electric drive state" does not include the starting torque Ts and inertia torque Ti. That is, the term "electric drive state" herein refers to an electric drive state where the first start control and downshift control are not performed. The magnitude of the output torque of the rotating electrical machine MG in the electric drive state is limited to the magnitude that is not larger than the maximum torque Tmax even if the rotating electrical machine MG further outputs the starting torque Ts. Accordingly, in the case where a request to start the internal combustion engine ENG is made in the electric travel state, the internal combustion engine ENG can be appropriately started by the first start control. In the present embodiment, the vehicle control unit 34 determines required rotating electrical machine torque of the magnitude equal to or smaller than the allowable torque Ta when determining the required rotating electrical machine torque in the electric drive state. The magnitude of torque (starting torque Ts) that is transmitted from the rotating electrical machine MG side toward the internal combustion engine ENG side via the engagement device SSC may change during the first start control. However, for example, the allowable torque Ta can be determined by subtracting maximum starting torque Ts required during the first start control from the maximum torque Tmax, or the allowable torque Ta can be determined by subtracting the average value of the starting torque Ts required during the first start control from the maximum torque Tmax. As shown in FIG. 4, since the maximum torque Tmax that can be output from the rotating electrical machine MG generally changes according to the rotational speed of the rotating electrical machine MG, the magnitude of the allowable torque Ta also changes according to the rotational speed of the rotating electrical machine MG. In view of the fact that the maximum torque Tmax that can be output from the rotating electrical machine MG changes according to the amount of electricity (state of charge) stored in the electrical storage device 36, the allowable torque Ta may be variable according to the amount of electricity (state of charge) stored in the electrical storage device 36.

Situations where the rotating electrical machine MG needs to output torque for other purposes in addition to the traveling torque include a situation where a downshift is performed in the electric drive state, in addition to a situation where the first start control is performed. In order to transmit torque of the same magnitude as required wheel torque to the wheels W even during the downshift control in the electric drive state, the rotating electrical machine MG needs to output, in addition to the traveling torque, the inertia torque Ti for changing the rotational speed of the rotating electrical machine MG by an amount corresponding to the change of the speed ratio due to the downshift. The inertia torque Ti is torque of the magnitude equal to the moment of inertia of the rotating electrical machine MG (rotor) multiplied by the rate of change of the rotational speed (rotation acceleration) of the rotating electrical machine MG (rotor). Accordingly, for example, in the case where a request to start the internal combustion engine ENG is made while a downshift is being performed in the electric drive state and the first start control is performed in parallel with the downshift control, the rotating electrical machine MG is required to output both the starting torque Ts and the inertia torque Ti in addition to the traveling torque. However, a request to start the internal combustion engine ENG is typically made in situations where required wheel torque cannot be achieved only with the rotating electrical machine MQG it is expected that the magnitude of traveling torque at that time is often close to the allowable torque Ta. When the magnitude of traveling torque at that time is close to the allowable torque Ta, the total of the traveling torque, the starting torque Ts, and the inertia torque Ti is larger than the maximum torque Tmax, as shown by dashed line in FIG. 4. That is, when the first start control is performed in parallel with the downshift control, a shortage of the output torque of the rotating electrical machine MG may occur, which may affect the progress of the downshift operation that has been started. FIG. 4 shows an example in which the magnitude of the inertia torque Ti is smaller than the starting torque Ts. However, there are cases where the magnitude of the inertia torque Ti is larger than the starting torque Ts, depending on setting of a target rate of change of the rotational speed of the internal combustion engine ENG in the first start control and setting of a target rate of change of the rotational speed of the rotating electrical machine MG in the downshift control.

As described above, in the case where a request to start the internal combustion engine ENG is made while a downshift is being performed in the electric drive state, and the first start control is performed in parallel with the downshift control, the progress of the downshift operation that has already been started may be affected. In view of this, in the case where a request to start the internal combustion engine ENG is made while a downshift is being performed in the electric drive state, the vehicle control unit 34 (control device 32) does not perform the first start control (i.e., inhibits the first start control) until the downshift is completed. That is, the vehicle control unit 34 does not perform the first start control as long as the rotating electrical machine MG needs to output the inertia torque Ti. In other words, in the case where a request to start the internal combustion engine ENG is made while a downshift is being performed in the electric drive state, and the first start control is to be performed, the vehicle control unit 34 (control device 32) performs the first start control after the downshift is completed.

Moreover, in the present embodiment, in the case where a request to start the internal combustion engine ENG is made while a downshift is being performed in the electric drive state, the vehicle control unit 34 (control device 32) does not perform the first start control until a change of the rotational speed of the rotating electrical machine MG due to the output torque of the rotating electrical machine MG for the downshift (hereinafter, referred to as a "change of the rotational speed of the rotating electrical machine MG for the downshift") is completed. In other words, in the case where a request to start the internal combustion engine ENG is made while a downshift is being performed in the electric drive state, and the first start control is to be performed, the vehicle control unit 34 (control device 32) performs the first start control after a change of the rotational speed of the rotating electrical machine MG for the downshift is completed. A change of the rotational speed of the rotating electrical machine MG for the downshift is made by the output torque of the rotating electrical machine MG, and the amount of this change of the rotational speed is determined according to the amount of change of the speed ratio of the shift speed from before to after the downshift.

In the present embodiment, the control to start the internal combustion engine ENG, which is performed by the vehicle control unit 34, includes the second start control in addition to the first start control. In the present embodiment, in the case where a request to start the internal combustion engine ENG is made while a downshift is being made in the electric drive state, the vehicle control unit 34 (control device 32) performs the second start control if a torque response request is a high response request state. If the torque response request is a low response request state, the vehicle control unit 34 (control device 32) performs the first start control after a change of the rotational speed of the rotating electrical machine MG for the downshift is completed. The second start control is the control to start the internal combustion engine ENG, which does not require the output torque of the rotating electrical machine MG. Accordingly, the second start control can be started without waiting for a change of the rotational speed of the rotating electrical machine MG for the downshift to be completed. With the above configuration, the state where the output torque of the internal combustion engine ENG can be transmitted to the wheels W can be more quickly attained in the case where a torque response request is a high response request state, as compared to the case where the first start control is always performed after a change of the rotational speed of the rotating electrical machine MG for the downshift is completed.

The torque response request is a request for response to the torque to be transmitted to the wheels W (wheel transmission torque). The low response request state is the state where the required response is lower than in the high response request state. The response herein refers to the response regarding time from the time the driver performs an operation of changing required wheel torque (e.g., an operation of the accelerator pedal etc.) to the time this change of the required wheel torque is reflected in the wheel transmission torque. The shorter this time is, the higher the response is. For example, the torque response request is determined based on at least one of the accelerator operation amount, the rate of change of the accelerator operation amount, the vehicle mode, and the vehicle speed.

Regarding the accelerator operation amount, the rate of change of the accelerator operation amount, and the vehicle speed, the torque response request is determined so that the torque response request becomes higher as the accelerator operation amount, the rate of change of the accelerator operation amount, and the vehicle speed increase. Regarding the vehicle mode, the torque response request is determined according to the level of torque response corresponding to the vehicle mode (e.g., a normal mode, a sport mode, etc.) selected by the driver. In the case where the torque response request is represented by a numerical value (index) that increases as the level of request increases, the high response request state is the state where this numerical value is equal to or larger than a threshold value, and the low response request state is the state where this numerical value is smaller than the threshold value.

As described above, in the case where a request to start the internal combustion engine ENG is made while a downshift is being performed in the electric drive state, the vehicle control unit 34 does not perform the first start control until a change of the rotational speed of the rotating electrical machine MG for the downshift is completed. The expression "does not perform the first start control" means that an increase (basically an increase from zero) in transmission torque of the engagement device SSC is not started until a change of the rotational speed of the rotating electrical machine MG for the downshift is completed, and does not exclude the configuration in which supply of oil pressure to the engagement device SSC is started by the time this change of the rotational speed is completed. As described above, in the case where a request to start the internal combustion engine ENG is made while a downshift is being performed in the electric drive state, and the first start control is to be performed, the vehicle control unit 34 (control device 32) performs the first start control after a change of the rotational speed of the rotating electrical machine MG for the downshift is completed. In the case where a request to start the internal combustion engine ENG is made while a downshift is being performed in the electric drive state, and the torque response request is the low response request state, the vehicle control unit 34 performs the first start control after a change of the rotational speed of the rotating electrical machine MG for the downshift is completed. The expression "perform the first start control" means that an increase in transmission torque of the engagement device SSC is started after the change of the rotational speed is completed, and does not exclude the configuration in which supply of oil pressure to the engagement device SSC is started by the time this change of the rotational speed is completed.

The vehicle control unit 34 performs the above control in the case where a request to start the internal combustion engine ENG is made while a downshift is being performed in the electric drive state. However, in the case where the traveling torque is negative torque, such a shortage of the output torque of the rotating electrical machine MG as described above is less likely to occur. In view of this, the vehicle control unit 34 may perform the above control only in the case where a request to start the internal combustion engine ENG is made while an on-downshift is being performed in the electric drive state. The on-downshift refers to a downshift in the state where torque in the direction of forward acceleration is transmitted to the wheels W (the state where the traveling torque is positive torque). For example, in the case where a request to start the internal combustion engine ENG is made while an off-downshift, which is a downshift in the state where the traveling torque is negative torque, is being performed in the electric drive state, the vehicle control unit 34 may start the first start control before a change of the rotational speed of the rotating electrical machine MG for the downshift is completed.

The vehicle control unit 34 performs the first start control or the second start control in cases other than those described above. That is, in the present embodiment, the first start control is started in the case where a request to start the internal combustion engine ENG is made when a downshift is not being performed in the electric drive state. The inertia torque Ti is not output from the rotating electrical machine MG when a downshift is not being performed. Accordingly, even if the rotating electrical machine MG is caused to output the starting torque Ts associated with the first start control, in addition to the traveling torque, such a shortage of the output torque of the rotating electrical machine MG as described above is less likely to occur. Accordingly, in the case where a downshift is not being performed, the first start control is started as soon as a request to start the internal combustion engine ENG is made. The internal combustion engine ENG can thus be started quickly in the case where a downshift is not being performed.

More preferably, the vehicle control unit 34 performs the first start control or the second start control according to whether the torque response request is the low response request state or the high response request state. That is, in the case where a request to start the internal combustion engine ENG is made when a downshift is not being performed in the electric drive state, the vehicle control unit 34 starts the first start control when the torque response request is the low response request state, and starts the second start control when the torque response request is the high response request state. It is preferable that, even if a downshift is not being performed, the maximum output torque Tmax of the rotating electrical machine MG can be used as the traveling torque if the torque response request is the high response request state. In such a case, the second start control is performed to start the internal combustion engine ENG with the output torque of the starter motor ST. In the second start control, the rotating electrical machine MG need not output the starting torque Ts and the inertia torque Ti. The maximum output torque Tmax of the rotating electrical machine MG can thus be used as the traveling torque, and torque corresponding to higher required wheel torque can be output.

Figure 5:
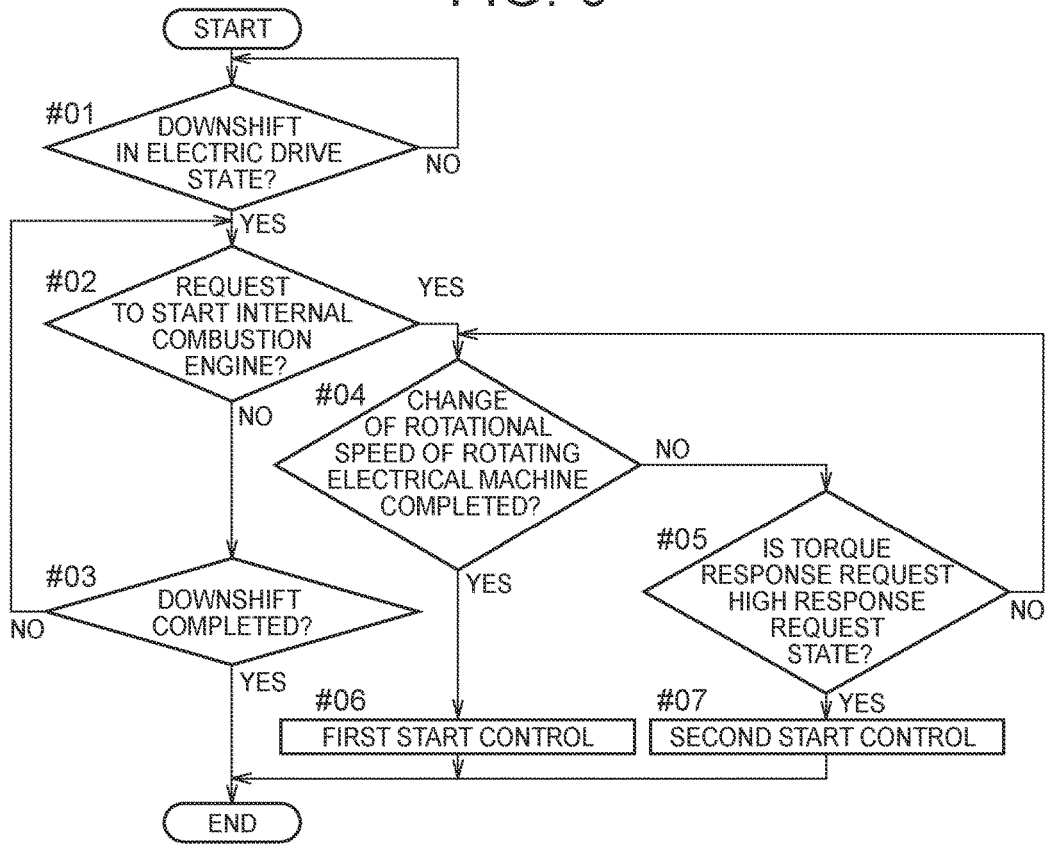
FIG. 5 is a flowchart showing a procedure of a start control selection process according to the embodiment.

In the present embodiment, the vehicle control unit 34 (control device 32) performs a start control selection process, namely a process of selecting control to start the internal combustion engine ENGC according to the procedure shown in FIG. 5. FIG. 5 is a flowchart showing the start control selection process that is performed while a downshift is being performed in the electric drive state. While a downshift is being performed in the electric drive state (step #01: Yes), the vehicle control unit 34 monitors if there is a request to start the internal combustion engine ENG (step #02) until the downshift is completed (step #03: No). If there is a request to start the internal combustion engine ENG (step #02: Yes), a process of selecting one of the first start control and the second start control is performed. Specifically, regarding determination of whether a change of the rotational speed of the rotating electrical machine MG for the downshift has been completed or not (step #04) and determination of whether the torque response request is the high response request state or not (step #05), if an affirmative determination is first made in step #04 (step #04: Yes), the first start control is selected (step #06). If an affirmative determination is first made in step #05 (step #05: Yes), the second start control is selected (step #07).

Accordingly, the first start control is selected in the case where a change of the rotational speed of the rotating electrical machine MG for the downshift has already been completed at the time a request to start the internal combustion engine ENG is made. The first start control is also selected in the case where a change of the rotational speed of the rotating electrical machine MG for the downshift has not been completed at the time a request to start the internal combustion engine ENG is made, and the torque response request does not become the high response request state by the time the change of the rotational speed of the rotating electrical machine MG for the downshift is completed. On the other hand, the second start control is selected in the case where a change of the rotational speed of the rotating electrical machine MG for the downshift has not been completed at the time a request to start the internal combustion engine ENG is made, and the torque response request at that time is the high response request state. The second start control is also selected in the case where a change of the rotational speed of the rotating electrical machine MG for the downshift has not been completed at the time a request to start the internal combustion engine ENG is made, and the torque response request at that time is not the high response request state, but the torque response request becomes the high response request state by the time the change of the rotational speed of the rotating electrical machine MG for the downshift is completed.

The above example is described with respect to the case where the routine returns to step #04 if a negative determination is made in step #05 (step #05: No). However, the first start control may be selected if a negative determination is made in step #05 (step #5: No). This is different from the example shown in FIG. 5 in that the first start control rather than the second start control is selected in the situation where a change of the rotational speed of the rotating electrical machine MG for the downshift has not been completed at the time a request to start the internal combustion engine ENG is made, and the torque response request at that time is not the high response request state, but the torque response request becomes the high response request state by the time the change of the rotational speed of the rotating electrical machine MG for the downshift is completed.

Figure 6:
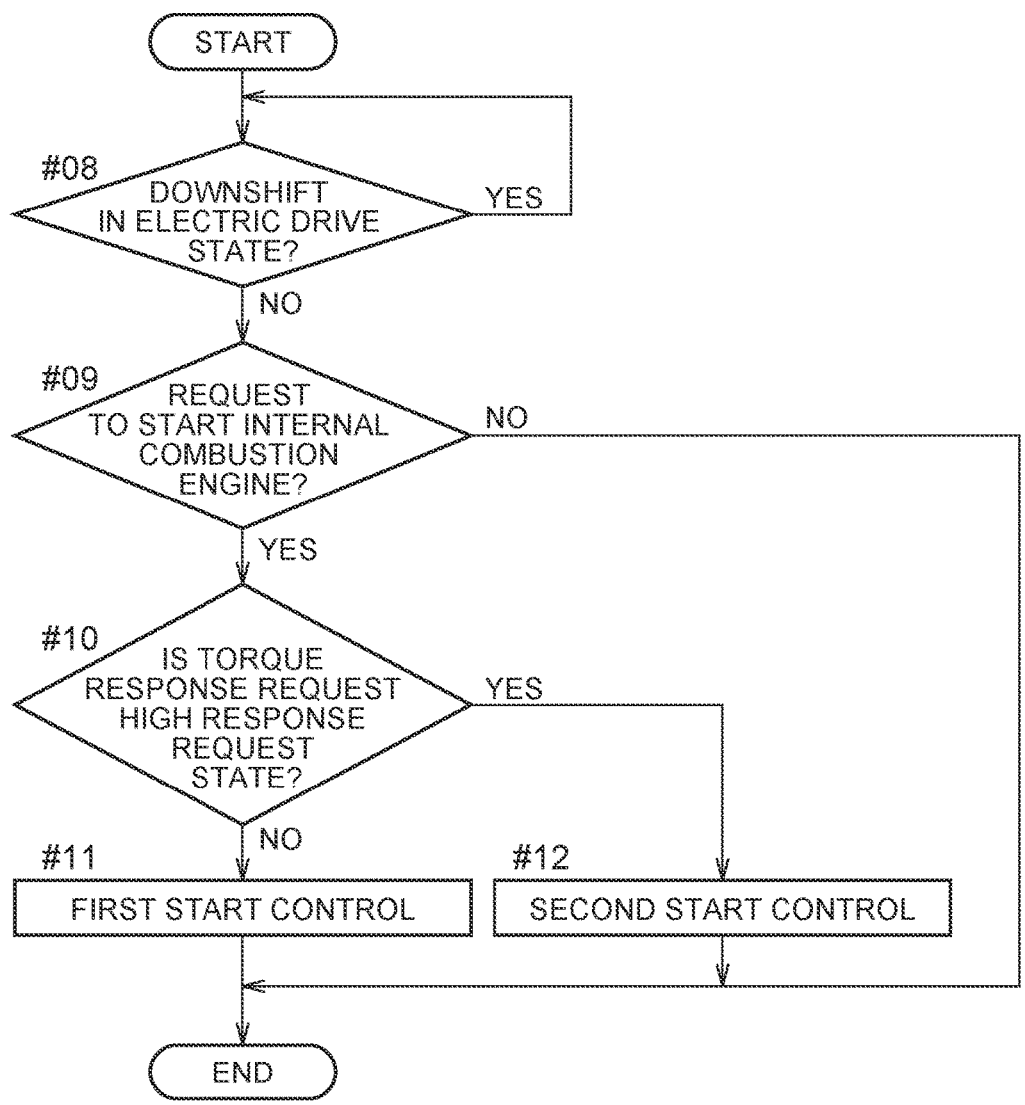
FIG. 6 is a flowchart showing another procedure of the start control selection process according to the embodiment.

In the present embodiment, the vehicle control unit 34 (control device 32) performs a start control selection process, namely a process of selecting control to start the internal combustion engine ENG, according to the procedure shown in FIG. 6, when a downshift is not being performed in the electric drive state. FIG. 6 is a flowchart showing the start control selection process that is performed when a downshift is not being performed in the electric drive state. When a downshift is not being performed in the electric drive state (step #08: No), the vehicle control unit 34 monitors if there is a request to start the internal combustion engine ENG (step #09). If there is a request to start the internal combustion engine ENG (step #09: Yes), it is determined whether the torque response request is the high response request state or not (step #10). If the torque response request is not the high response request state, namely if the torque response request is the low response request state (step #10: No), the first start control is selected (step #11). If the torque response request is the high response request state (step #10: Yes), the second start control is selected (step #12).

Figure 7:
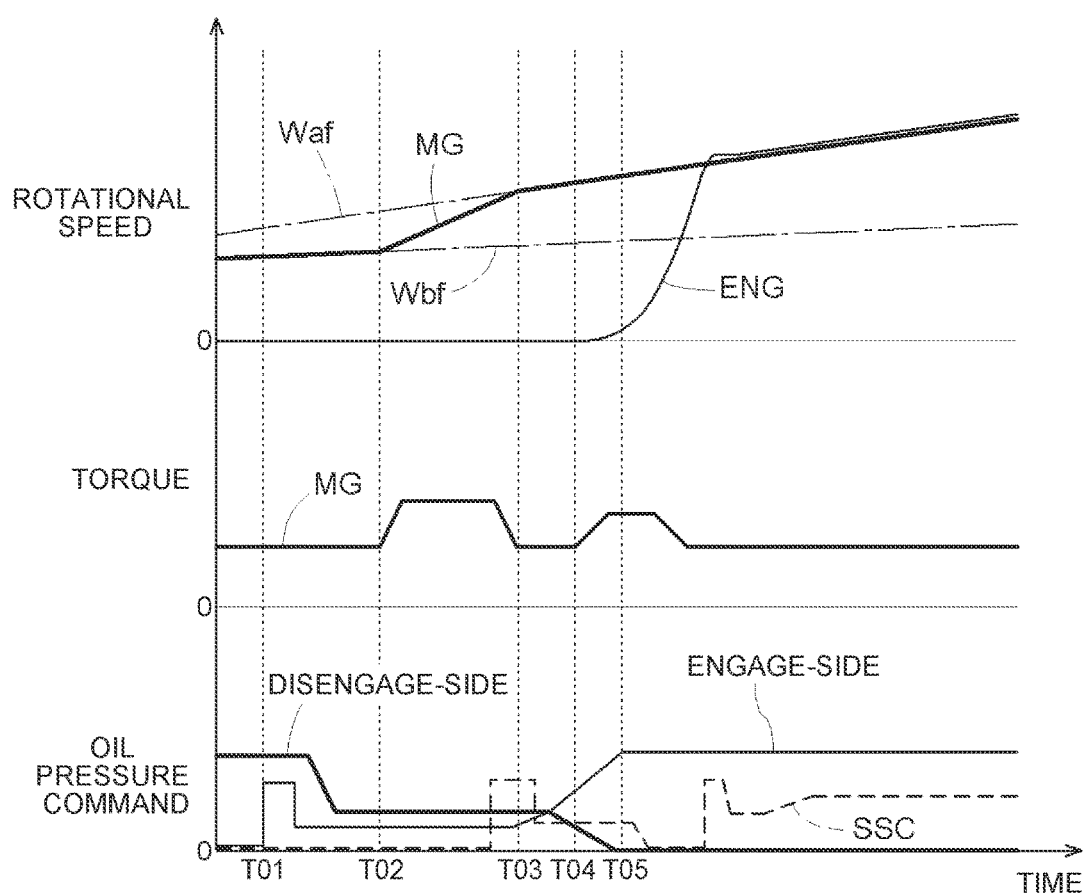
FIG. 7 is a timing chart showing an example of a control behavior of internal combustion engine start control according to the embodiment.
Figure 8:
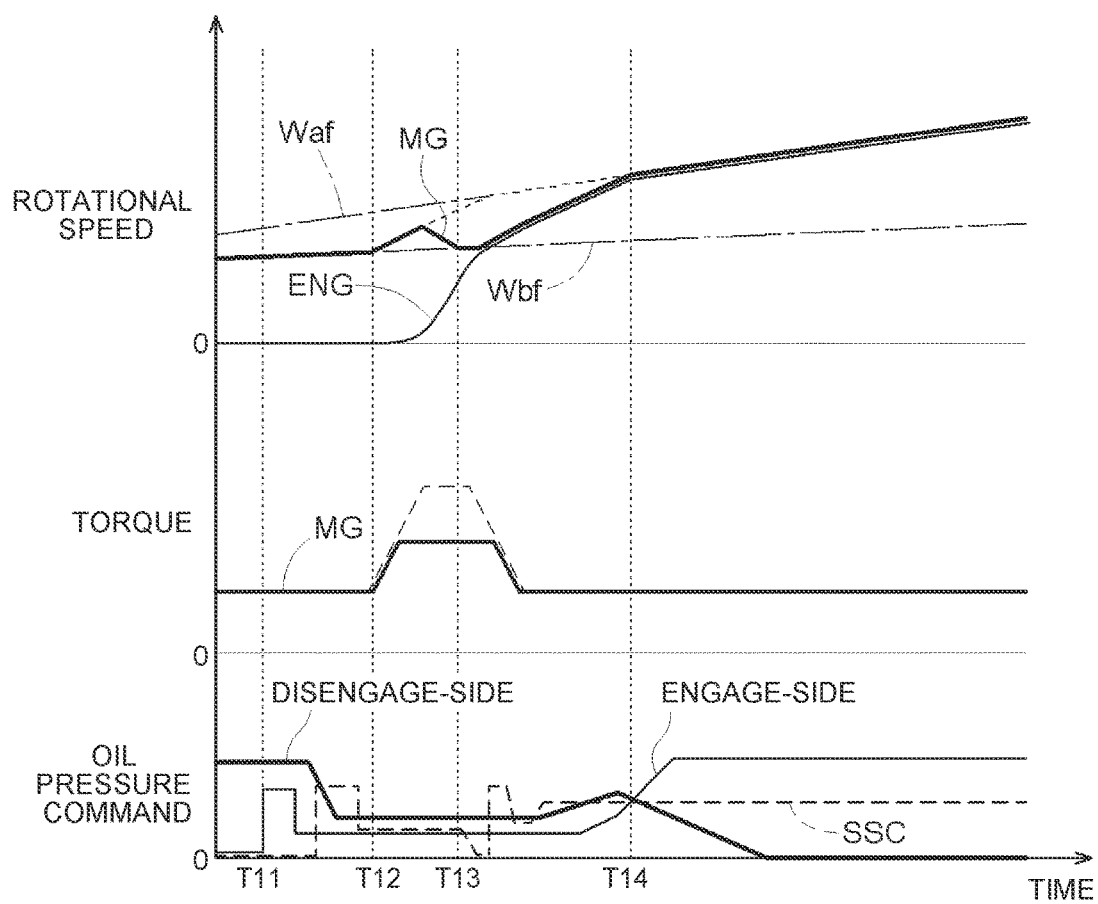
FIG. 8 is a timing chart showing an example of a control behavior of internal combustion engine start control according to a comparative example.
Figure 9:
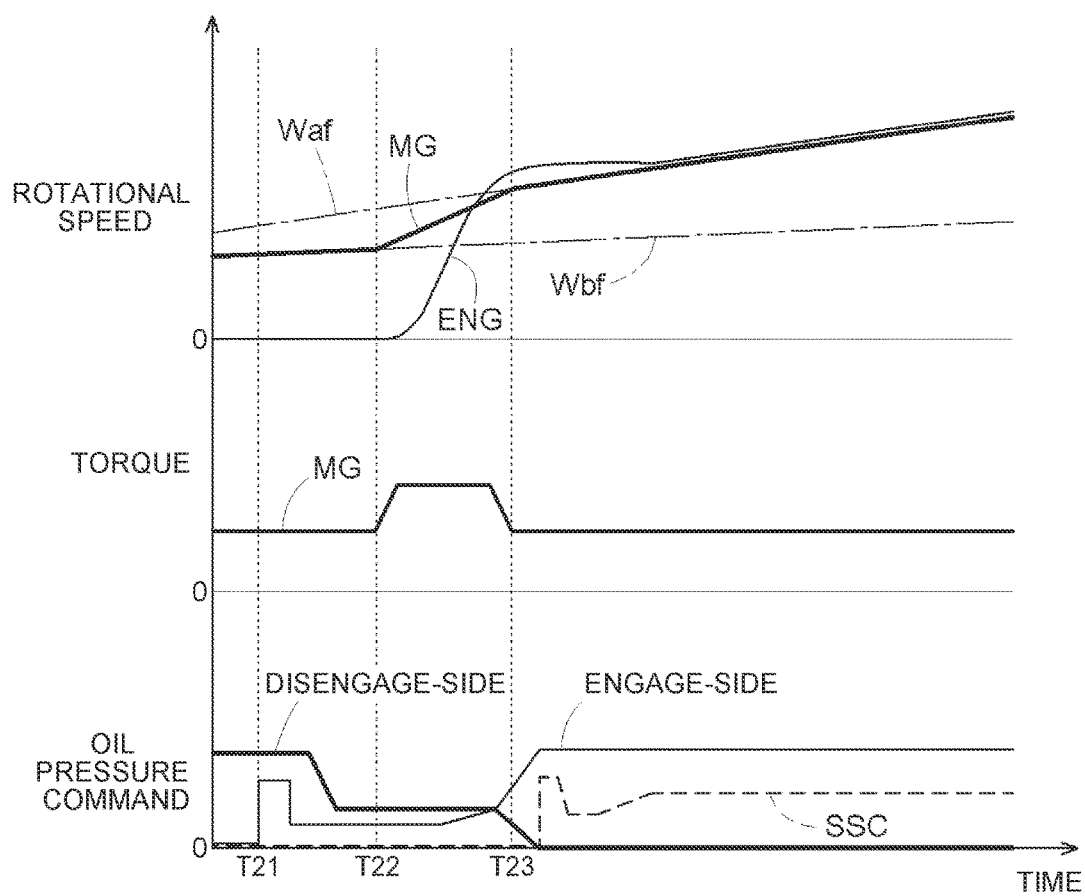
FIG. 9 is a timing chart showing another example of the control behavior of the internal combustion engine start control according to the embodiment.

The control to start the internal combustion engine according to the present embodiment will be described in detail with reference to the example shown in FIG. 7 and the example shown in FIG. 9. FIG. 7 is a timing chart showing a specific example in which a request to start the internal combustion engine ENG is made while a downshift is being performed in the electric drive state, and the first start control is performed after a change of the rotational speed of the rotating electrical machine MG for the downshift is completed. FIG. 9 is a timing chart showing a specific example in which a request to start the internal combustion engine ENG is made while a downshift is being performed in the electric drive state, and the second start control is performed. FIG. 8 is a timing chart showing a comparative example.

In the example shown in FIG. 7, until time T01, the vehicle 1 travels with the output torque of the rotating electrical machine MG with the drive mode being set to the electric drive mode and the engagement device SSC being in a disengaged state. Rotation of the internal combustion engine ENG has stopped and the rotating electrical machine MG outputs positive torque (traveling torque) of the magnitude corresponding to the required wheel torque. At time T01 or before time T01, a target shift speed is changed to a lower shift speed, and downshift control (in this example, on-downshift control) is started at time T01. In the example shown in FIG. 7, adjustment of an oil pressure command for an engage-side engagement device is started at time T01 so that the engagement pressure of the engage-side engagement device increases from zero to an engage-side preliminary pressure, and adjustment of an oil pressure command for a disengage-side engagement device is started between time T01 and time T02 so that the engagement pressure of the disengage-side engagement device decreases from a full engagement pressure to a minimum engagement pressure. The engage-side preliminary pressure is an engagement pressure in a standby state before engagement of the engage-side engagement device. The engage-side preliminary pressure is set to a stroke end pressure, which is an engagement pressure for positioning a piston at a stroke end position, or a pressure smaller than the stroke end pressure by a predetermined pressure. The minimum engagement pressure is the lowest engagement pressure that can maintain the disengage-side engagement device in a direct engaged state in the state where the traveling torque of the magnitude corresponding to the required wheel torque, which is output from the rotating electrical machine MG is being transmitted.

In this example, it is assumed that a request to start the internal combustion engine ENG is made between time T01 and time T02, and the torque response request continues to be the low response request state until a change of the rotational speed of the rotating electrical machine MG for the downshift is completed (time T03). The first start control is therefore performed after a change of the rotational speed of the rotating electrical machine MG for the downshift is completed (time T03 or later). Accordingly, during control in an inertia phase which is started at time T02, the rotating electrical machine MG need not output the starting torque Ts, and a change of the rotational speed of the rotating electrical machine MG for the downshift can be appropriately made by the inertia torque Ti that is output in addition to the traveling torque by the rotating electrical machine MG. That is, at time T02, the disengage-side engagement device is switched from a direct engaged state to a slip engaged state and the rotational speed of the rotating electrical machine MG starts to increase from a pre-shift synchronous rotational speed Wbf. The oil pressure command for the disengage-side engagement device switched to the slip engaged state is adjusted so that the transfer torque capacity of the disengage-side engagement device corresponds to the magnitude of the required wheel torque.

If the rotational speed of the rotating electrical machine MG reaches a post-shift synchronous rotational speed Waf at time T03, the control in the inertia phase is finished. The pre-shift synchronous rotational speed Wbf is the rotational speed of the input member I in the state where all of the shift engagement devices to be engaged to establish the shift speed before shifting are in a direct engaged state, and is equal to the rotational speed of the output member O multiplied by the speed ratio of the shift speed before shifting. The post-shift synchronous rotational speed Waf is the rotational speed of the input member I in the state where all of the shift engagement devices to be engaged to establish the shift speed after shifting are in a direct engaged state, and is equal to the rotational speed of the output member O multiplied by the speed ratio of the shift speed after shifting. For example, control to control the output torque of the rotating electrical machine MG to make the rotational speed of the rotating electrical machine MG closer to a target rotational speed (rotational speed control) is performed in the inertia phase.

Control in a torque phase is performed at time T03 when the control in the inertia phase is finished, or later than time T03. In the torque phase, the oil pressure command for the disengage-side engagement device is adjusted so that the engagement pressure of the disengage-side engagement device decreases toward zero, and the oil pressure command for the engage-side engagement device is adjusted so that the engagement pressure of the engage-side engagement device gradually increased to the full engagement pressure. During the control in the torque phase, a torque ratio gradually decreases with the increase in engagement pressure of the engage-side engagement device. The torque ratio is the ratio of input torque that is input from the rotating electrical machine MG side of the power transmission path to the speed change device TM (in this example, torque that is input from the input member I to the speed change device TM) to output torque that is output from the speed change device TM toward the wheel W side of the power transmission path (in this example, torque that is output from the speed change device TM to the output member O). In this example, the control in the torque phase is started between time T03 and time T04 and is finished at time T05.

In the present embodiment, when performing the first start control, the control device 32 controls the engagement device SSC so that the transmission torque of the engagement device SSC starts to increase during a period in which the torque ratio is 5 changing due to a downshift (that is, during a period in which the control in the torque phase is being performed). The timing at which the transmission torque of the engagement device SSC starts to increase is substantially the same as the timing at which the rotational speed of the internal combustion engine ENG starts to increase. In the example shown in FIG. 7, adjustment of an oil pressure command for the engagement device SSC is started a little before T03 so that the transmission torque of the engagement device SSC starts to increase at time T04. The engagement device SSC is thus switched from a disengaged state to a slip engaged state at time T04. The rotational speed of the internal combustion engine ENG starts to increase by the starting torque Ts that is transmitted from the rotating electrical machine MG side toward the internal combustion engine ENG side via the engagement device SSC in the slip engaged state. At this time, since the rotating electrical machine MG need not output the inertia torque Ti, such a shortage of the output torque of the rotating electrical machine MG as described above is less likely to occur. The oil pressure command for the engagement device SSC in the slip engaged state is adjusted so that the transfer torque capacity of the engagement device SSC corresponds to the magnitude of the set starting torque Ts.

If the rotational speed of the internal combustion engine ENG becomes higher than such a rotational speed that combustion is possible, combustion in the internal combustion engine ENG is started. Thereafter, in the state where the rotational speed of the internal combustion engine ENG further increases to such a speed that the internal combustion engine ENG and the rotating electrical machine MG can be regarded as rotating synchronously, namely in the state that the difference in rotational speed between the internal combustion engine ENG and the rotating electrical machine MG is smaller than a synchronous determination threshold value, the oil pressure command for the engagement device SSC is adjusted to increase the engagement pressure of the engagement device SSC to the full engagement pressure, so that the engagement device SSC is switched from the slip engaged state to a direct engaged state. In the example shown in FIG. 7, in order not to inhibit an increase in rotational speed of the internal combustion engine ENG after combustion in the internal combustion engine ENCG the engagement pressure of the engagement device SSC is first reduced after combustion of the internal combustion engine ENG is started, and is then fully increased to the full engagement pressure. In the example shown in FIG. 7, the engagement device SSC is switched from the slip engaged state to the direct engaged state in the state where the rotational speed of the internal combustion engine ENG is higher than that of the rotating electrical machine MG, so that the direction of torque transmission is not reversed before and after the engagement device SSC is switched to the direct engaged state.

This example is described with respect to the case where the engagement device SSC is controlled so that the transmission torque of the engagement device SSC starts to increase during a period in which the torque ratio is changing due to a downshift. However, the engagement device SSC may be controlled so that the transmission torque of the engagement device SSC starts to increase after a period in which the torque ratio is changing due to a downshift.

As described above, in the present embodiment, in the case where the first start control is to be performed in response to a request to start the internal combustion engine ENG which is made during a period in which a downshift is being performed in the electric drive state, the first start control is performed after a change of the rotational speed of the rotating electrical machine MG for the downshift is completed. The rotating electrical machine MG need not output the inertia torque Ti and the starting torque Ts in addition to the traveling torque at the same time, and the internal combustion engine ENG can be started without significantly affecting the progress of the downshift operation that has already been started. A comparative example in which such control is not performed and therefore shock is caused as a downshift operation that has already been started is affected by the control to start the internal combustion engine ENG will be described below with reference to FIG. 8.

Time T11 in FIG. 8 corresponds to time T01 in FIG. 7. That is, in the comparative example of FIG. 8 as well, downshift control is started at time T11. In this comparative example, a request to start the internal combustion engine ENG is made between time TI and time T12, and the first start control is performed in response to this request without waiting for a change of the rotational speed of the rotating electrical machine MG to be completed. Accordingly, in this comparative example, adjustment of an oil pressure command for switching the engagement device SSC from a disengaged state to a slip engaged state is started between time T11 and time 12, and the engagement device SSC is switched to a slip engaged state at time T12 when control in the inertia phase is started. During the control in the inertia phase which is started at time T12, the rotating electrical machine MG need output both the inertia torque Ti and the starting torque Ts in addition to the traveling torque. As described above, in situations where a request to start the internal combustion engine ENG is made, the total of the traveling torque, the starting torque Ts, and the inertia torque Ti tends to be larger than the maximum torque Tmax. In FIG. 8, it is assumed that the output torque of the rotating electrical machine MG cannot be increased to dashed line representing this total.

As shown in FIG. 8, if such a shortage of the output torque of the rotating electrical machine MG occurs, a change of the rotational speed of the rotating electrical machine MG for the downshift cannot be maintained, and the rotational speed of the rotating electrical machine MG which has increased toward the post-shift synchronous rotational speed Waf decreases toward the pre-shift synchronous rotational speed Wbf. At time T13 when the rotational speed of the rotating electrical machine MG decreases to the pre-shift synchronous rotational speed Wbf, the engagement device SSC is switched from a slip engaged state to a direct engaged state. At this time, shock may be caused by variation in torque that is transmitted by the engagement device SSC. In this comparative example, the rotational speed of the internal combustion engine ENG and the rotational speed of the rotating electrical machine MG then increase together, and the rotational speed of the rotating electrical machine MG reaches the post-shift synchronous rotational speed Waf at time T14.

A specific example of the present embodiment in which a request to start the internal combustion engine ENG is made while a downshift is being performed in the electric drive state, and the second start control is performed in response to the start request will be described with reference to FIG. 9. In the example shown in FIG. 9, time T21 corresponds to time T01 in FIG. 7. That is, in the specific example shown in FIG. 9 as well, the downshift control is started at time T21. In this example, it is assumed that the internal combustion engine ENG is started by the second start control because a request to start the internal combustion engine ENG is made between time T21 and time T22 and the torque response request at that time is the high response request state. In the example shown in FIG. 9, the second start control is started immediately after a request to start the internal combustion engine ENG is made, and the rotational speed of the internal combustion engine ENG starts to increase by the torque of the starter motor ST at time T22 when control in the inertia phase is started. Combustion in the internal combustion engine ENG is started and the rotational speed of the internal combustion engine ENG further increases. At time T23 when the control in the inertia phase is finished, the rotational speed of the internal combustion engine ENG is higher than the rotational speed of the rotating electrical machine MG. Thereafter, an oil pressure command for the engagement device SSC is adjusted to increase the engagement pressure of the engagement device SSC to the full engagement pressure, and the engagement device SSC is switched from a disengaged state to a direct engaged state.

3. Other Embodiments

Other embodiments of the control device will be described. The configuration of each embodiment described below may be used in combination with any of the configurations of the other embodiments unless inconsistency arises.

(1) The above embodiment is described with respect to an example in which in the case where a request to start the internal combustion engine ENG is made while a downshift is being performed in the electric drive state, the vehicle control unit 34 (control device 32) performs the second start control if the torque response request is the high response request state, and performs the first start control after a change of the rotational speed of the rotating electrical machine MG for the downshift is completed, if the torque response request is the low response request state. However, the present disclosure is not limited to this. In the case where a request to start the internal combustion engine ENG is made while a downshift is being performed in the electric drive state, the vehicle control unit 34 may decide if it should perform the second start control or perform the first start control after a change of the rotational speed of the rotating electrical machine MG for the downshift is completed, based on an index other than the torque response request. For example, based on the reason why the internal combustion engine start condition is satisfied, the vehicle control unit 34 may perform the second start control if the internal combustion engine start condition is satisfied in order to increase the wheel transmission torque, and may perform the first start control after a change of the rotational speed of the rotating electrical machine MG for the downshift is completed, if the internal combustion engine start condition is satisfied in order to cause the rotating electrical machine MG to generate electricity.

(2) The above embodiment is described with respect to an example in which the vehicle 1 includes the starter motor ST. However, the vehicle 1 may not include the starter motor ST, and the internal combustion engine ENG may be started only by the first start control.

Figure 10:
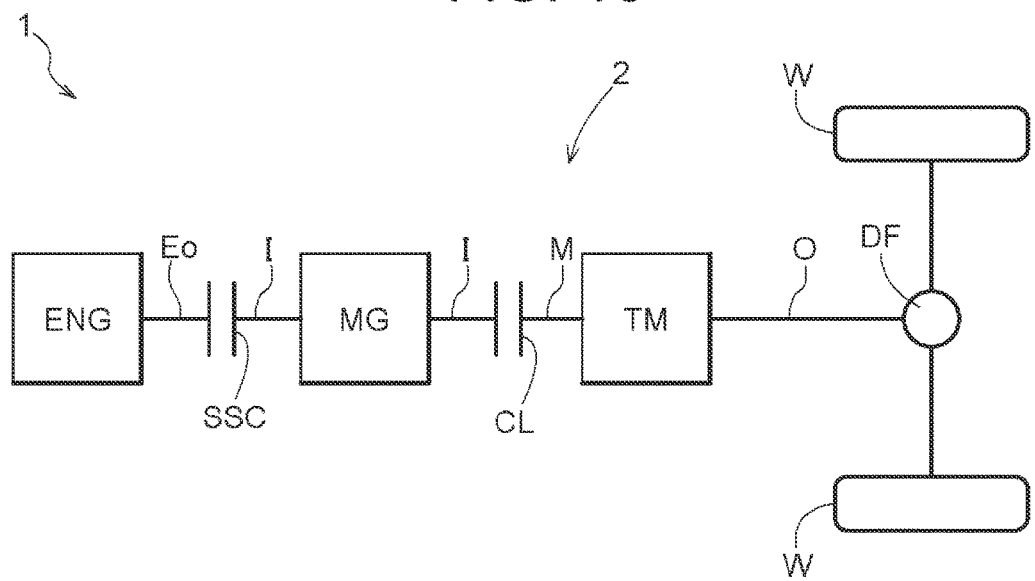
FIG. 10 is a diagram showing a general configuration of a vehicle drive device according to another embodiment.
Figure 11:
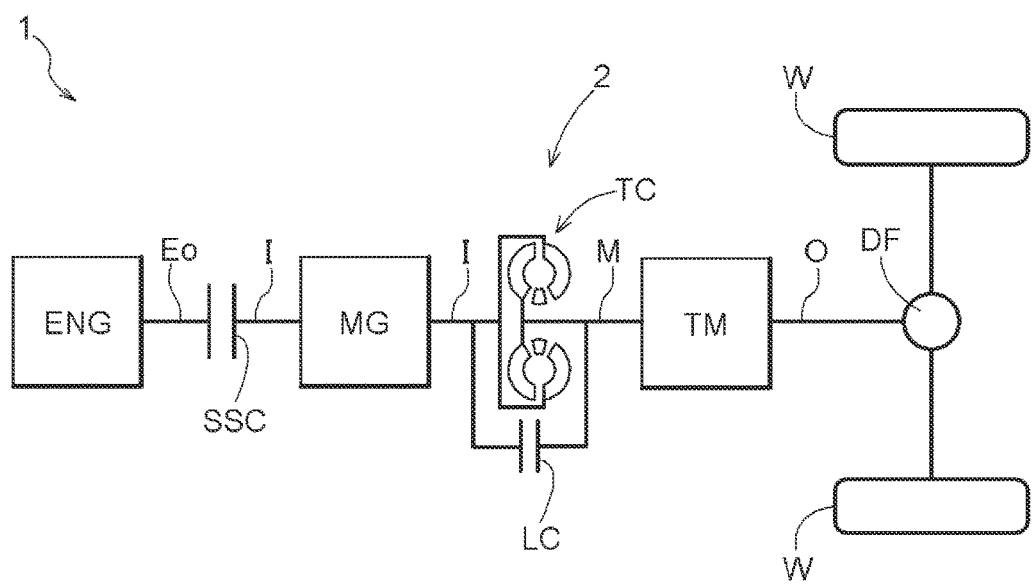
FIG. 11 is a diagram showing a general configuration of a vehicle drive device according to still another embodiment.

(3) The above embodiment is described with respect to an example in which the vehicle drive device 2 to be controlled by the control device 32 includes the engagement device SSC, the rotating electrical machine MC and the speed change device TM in this order from the internal combustion engine ENG side on the power transmission path connecting the internal combustion engine ENG and the wheels W. However, the control device 32 may control the vehicle drive devices 2 having other configurations. For example, as shown in FIG. 10, the control device 32 may control the vehicle drive device 2 in which a clutch CL is disposed on a power transmission path between the rotating electrical machine MG and the speed change device TM and the clutch CL selectively couples the input member I and an input shaft (intermediate shaft M) of the speed change device TM. Alternatively, as shown in FIG. 11, the control device 32 may control the vehicle drive device 2 in which a torque converter TC having a direct-coupling clutch CL is disposed on a power transmission path between the rotating electrical machine MG and the speed change device TM. The above embodiment is described with respect to an example in which the control device 32 controls the vehicle drive device 2 including a stepped automatic speed change device as the speed change device TM. However, the control device 32 may control a vehicle control device including other type of speed change device such as a dual clutch speed change device called dual clutch transmission (DCT).

(4) The above embodiment is described with respect to an example in which both the engagement device SSC and the shift engagement devices (excluding the one-way clutch F) are hydraulically driven engagement devices. However, either the engagement device SSC or the shift engagement devices (excluding the one-way clutch F), or both of them, may be an engagement device(s) that is controlled by a driving force other than the oil pressure, such as, e.g., a driving force of an electromagnet or a driving force of a servomotor.

(5) The above embodiment is described with respect to an example in which both the engagement device SSC and the shift engagement devices (excluding the one-way clutch F) are normally open engagement devices whose transfer torque capacity (engagement pressure) is reduced by reducing an oil pressure (oil pressure command) to be supplied thereto. However, either the engagement device SSC or the shift engagement devices (excluding the one-way clutch F), or both of them, may be a normally closed engagement device(s) which is engaged by a spring pressure etc. and whose transfer torque capacity (engagement pressure) is reduced by increasing an oil pressure (oil pressure command) to be supplied thereto.

(6) The above embodiment is described with respect to an example in which each shift speed is established by controlling two of the plurality of engagement devices to an engaged state. However, each shift speed may be established by controlling three or more of the plurality of engagement devices to an engaged state.

(7) The above embodiment is described with respect to an example in which the speed change device TM can establish six shift speeds with different speed ratios as forward shift speeds. However, the number of shift speeds that can be established by the speed change device TM may be other than "6" (e.g., "8").

(8) The above embodiment is described with respect to an example in which the control device 32 controls the vehicle drive device 2 including a stepped automatic speed change device as the speed change device TM. However, the control device 32 may control a vehicle control device including a stepless automatic speed change device called continuously variable transmission (CVT) as the speed change device TM. In this case, a downshift simply means changing the speed ratio so that the speed ratio after shifting is higher than the speed ratio before shifting.

(9) Assignment of the functional units in the drive control unit 30 described in the above embodiment is by way of example only, and a plurality of functional units may be combined or a single functional unit may be divided into a plurality of units.

(10) It should be understood that, regarding other configurations as well, the embodiments disclosed in this specification are shown by way of example only in all respects. A person skilled in the art can therefore perform various modifications as desired without departing from the spirit and scope of the present disclosure.

4. Summary of Embodiments

The embodiments described above have the following configurations.

A control device (32) controls a vehicle drive device (2) in which an engagement device (SSC), a rotating electrical machine (MG), and a speed change device (TM) are arranged in this order from an internal combustion engine (ENG) side on a power transmission path connecting the internal combustion engine (ENG) and wheels (W). First start control is start control to start the internal combustion engine (ENG) with output torque of the rotating electrical machine (MG) via the engagement device (SSC). An electric drive state is a drive state where a vehicle (1) is moved with the output torque of the rotating electrical machine (MG) with the engagement device (SSC) being in a disengaged state. In a case where a request to start the internal combustion engine (ENG) is made while a downshift for changing a speed ratio of the speed change device (TM) so that the speed ratio after shifting is higher than the speed ratio before shifting is being performed in the electric drive state, the control device performs the first start control after the downshift is completed.

With this configuration, in the case where a request to start the internal combustion engine (ENG) is made while a downshift is being performed in the electric drive state, and the first start control is to be performed, the first start control is performed after the downshift is completed. That is, the first start control that requires the rotating electrical machine (MG) to output starting torque (Ts) is not performed as long as the rotating electrical machine (MG) is required to output inertia torque (Ti) for changing a rotational speed of the rotating electrical machine (MG). Accordingly, the downshift operation that has already been started can be appropriately made to proceed even if a request to start the internal combustion engine (ENG) is made while a downshift is being performed in the electric drive state. For example, the internal combustion engine (ENG) can be started by performing the first start control after a change of the rotational speed of the rotating electrical machine (MG) for the downshift is completed (that is, when the rotating electrical machine (MG) need not output the inertia torque (Ti), or can be started before the above timing by a method that does not require the output torque of the rotating electrical machine (MG). In either case, the internal combustion engine (ENG) can be started without significantly affecting the progress of the downshift operation that has already been started.

In this embodiment, it is preferable that after the downshift is completed be after a change of the rotational speed of the rotating electrical machine (MG) which is caused by the output torque of the rotating electrical machine (MG) for the downshift is completed.

With this configuration, the first start control can be performed after the rotating electrical machine (MG) no longer needs to output the inertia torque (Ti) for the downshift. Accordingly, the internal combustion engine (ENG) can be started without significantly affecting the progress of the downshift operation that has already been started.

In this embodiment, it is preferable that a torque ratio be a ratio of input torque that is input from the rotating electrical machine (MG) side of the power transmission path to the speed change device (TM) to output torque that is output from the speed change device (TM) toward the wheel (W) side of the power transmission path, and in the case where the control device performs the first start control after the downshift is completed, the control device control the engagement device (SSC) so that transmission torque of the engagement device (SSC) starts to increase during a period in which the torque ratio is changing due to the downshift.

When the engagement device (SSC) is switched from a disengaged state to a slip engaged state in order to transmit the starting torque (Ts) from the rotating electrical machine (MG) to the internal combustion engine (ENG), torque to be transmitted to the wheels (W) (wheel transmission torque) may vary at the timing the transmission torque of the engagement device (SSC) starts to increase. With the above configuration, the timing the wheel transmission torque varies can be included in the period in which the torque ratio is changing due to the downshift. During the period in which the torque ratio is changing due to the downshift, the magnitude of the wheel transmission torque typically changes according to the change of the torque ratio. Accordingly, even if the wheel transmission torque varies at the above timing, this variation can be included in the change of the wheel transmission torque which is caused by the change of the torque ratio. An occupant of the vehicle (1) such as the driver thus feels less uncomfortable.

In the present embodiment, it is preferable that the control device start the first start control in a case where the request to start the internal combustion engine (ENG) is made when the downshift is not being performed in the electric drive state.

With this configuration, when the downshift is not being performed, the rotating electrical machine (MG) need not output the inertia torque (Ti) for the downshift. Accordingly, even if the rotating electrical machine (MG) is caused to output the starting torque (Ts) associated with the first start control in addition to the traveling torque, a shortage of the output torque of the rotating electrical machine (MG) is less likely to occur. Accordingly, with this configuration, the internal combustion engine (ENG) can be quickly started in the case where a request to start the internal combustion engine (ENG) is made when the downshift is not being performed.

In this embodiment, it is preferable that second start control be start control to start the internal combustion engine (ENG) with output torque of a starter motor (ST), and in the case where the request to start the internal combustion engine (ENG) is made while the downshift is being performed in the electric drive state, the control device perform the second start control if a torque response request, which is a request for response to torque to be transmitted to the wheels (W), is a high response request state, and perform the first start control if the torque response request is a low response request state, which is a state where required response is lower than in the high response request state.

With this configuration, in the case where the torque response request is the high response request state, the control to start the internal combustion engine by the second start control that does not require the output torque of the rotating electrical machine (MG) can be started without waiting for a change of the rotational speed of the rotating electrical machine (MG) to be completed. Accordingly, the state where the output torque of the internal combustion engine (ENG) can be transmitted to the wheels (W) can be more quickly attained as compared to the case where the internal combustion engine (ENG) is started by performing the first start control after the change of the rotational speed of the rotating electrical machine (MG) for the downshift is completed. On the other hand, in the case where the torque response request is the low response request state, the internal combustion engine (ENG) is started by performing the first start control after the change of the rotational speed of the rotating electrical machine (MG) for the downshift is completed. That is, in the case where the torque response request is the low response request state, the internal combustion engine (ENG) can be started while giving priority to preventing generation of operating sound of the starter motor (ST) which may make the occupant of the vehicle (1) such as the driver feel uncomfortable over quickly attaining the state where the output torque of the internal combustion engine (ENG) can be transmitted to the wheels (W). This is advantageous in that durability of the starter motor (ST) is ensured as the second start control is not performed unnecessarily.

It is preferable that, in the case where the request to start the internal combustion engine (ENG) is made when the downshift is not being performed in the electric drive state, the control device start the first start control if the torque response request is the low response request state, and start the second start control if the torque response request is the high response request state.

With this configuration, in the case where the request to start the internal combustion engine (ENG) is made when the downshift is not being performed, and the torque response request is the low response request state, the internal combustion engine (ENG) can be quickly started with the output torque of the rotating electrical machine (MG) by starting the first start control. In the case where the request to start the internal combustion engine (ENG) is made when the downshift is not being performed, and the torque response request is the high response request state, the internal combustion engine (ENG) is started with the output torque of the starter motor (ST) by starting the second start control. By performing the second start control in such a case, maximum output torque (Tmax) of the rotating electrical machine (MG) can be used as the traveling torque, because the rotating electrical machine (MG) need not output the starting torque (Ts) and the inertia torque (Ti). Accordingly, a need for higher required wheel torque can be satisfied.

INDUSTRIAL APPLICABILITY

The technique according to the present disclosure is applicable to control devices that control a vehicle drive device including an engagement device, a rotating electrical machine, and a speed change device in this order from the internal combustion engine side on a power transmission path connecting the internal combustion engine and wheels.

The invention claimed is:
1. A control device that controls a vehicle drive device in which an engagement device, a rotating electrical machine, and a speed change device are arranged in this order from an internal combustion engine side on a power transmission path connecting the internal combustion engine and wheels, wherein:

first start control is start control to start the internal combustion engine with output torque of the rotating electrical machine via the engagement device, an electric drive state is a drive state where a vehicle is moved with the output torque of the rotating electrical machine with the engagement device being in a disengaged state, and a torque ratio is a ratio of input torque that is input from a rotating electrical machine side of the power transmission path to the speed change device to output torque that is output from the speed change device toward a wheel side of the power transmission path, the control device comprising:

an electronic control unit that is configured to, in a case where a request to start the internal combustion engine is made while a downshift for changing a speed ratio of the speed change device so that the speed ratio after shifting is higher than the speed ratio before shifting is being performed in the electric drive state, perform the first start control after a change of a rotational speed of the rotating electrical machine that is caused by the output torque of the rotating electrical machine for the downshift is completed and during a period in which the torque ratio is changing due to the downshift.

2. The control device according to claim 1, wherein
in the case where the electronic control unit performs the first start control, the electronic control unit controls the engagement device so that transmission torque of the engagement device starts to increase during a period in which the torque ratio is changing due to the downshift.

3. The control device according to claim 2, wherein
second start control is start control to start the internal combustion engine with output torque of a starter motor, and
in the case where the request to start the internal combustion engine is made while the downshift is being performed in the electric drive state, the electronic control unit performs the second start control if a torque response request, which is a request for response to torque to be transmitted to the wheels, is a high response request state, and performs the first start control if the torque response request is a low response request state, which is a state where required response is lower than in the high response request state.

4. The control device according to claim 3, wherein
in the case where the request to start the internal combustion engine is made when the downshift is not being performed in the electric drive state, the electronic control unit starts the first start control if the torque response request is the low response request state, and starts the second start control if the torque response request is the high response request state.

5. The control device according to claim 1, wherein
the electronic control unit starts the first start control in a case where the request to start the internal combustion engine is made when the downshift is not being performed in the electric drive state.

6. The control device according to claim 5, wherein
second start control is start control to start the internal combustion engine with output torque of a starter motor, and
in the case where the request to start the internal combustion engine is made while the downshift is being performed in the electric drive state, the electronic control unit performs the second start control if a torque response request, which is a request for response to torque to be transmitted to the wheels, is a high response request state, and performs the first start control if the torque response request is a low response request state, which is a state where required response is lower than in the high response request state.

7. The control device according to claim 6, wherein
in the case where the request to start the internal combustion engine is made when the downshift is not being performed in the electric drive state, the electronic control unit starts the first start control if the torque response request is the low response request state, and starts the second start control if the torque response request is the high response request state.

8. The control device according to claim 1, wherein
second start control is start control to start the internal combustion engine with output torque of a starter motor, and
in the case where the request to start the internal combustion engine is made while the downshift is being performed in the electric drive state, the electronic control unit performs the second start control if a torque response request, which is a request for response to torque to be transmitted to the wheels, is a high response request state, and performs the first start control if the torque response request is a low response request state, which is a state where required response is lower than in the high response request state.

9. The control device according to claim 8, wherein
in the case where the request to start the internal combustion engine is made when the downshift is not being performed in the electric drive state, the electronic control unit starts the first start control if the torque response request is the low response request state, and starts the second start control if the torque response request is the high response request state.

10. The control device according to claim 1, wherein
the start of the first start control is a start of an increase in a transmission torque of the engagement device during a period in which the torque ratio is changing due to the downshift.

* * * * *